(12) United States Patent
Poornachandran et al.

(10) Patent No.: US 12,210,941 B2
(45) Date of Patent: Jan. 28, 2025

(54) AUTONOMOUS MACHINE KNOWLEDGE TRANSFER

(71) Applicant: Intel Corporation, Santa Clara, CA (US)

(72) Inventors: Rajesh Poornachandran, Portland, OR (US); Vinayak Honkote, Bangalore (IN); Rita H. Wouhaybi, Portland, OR (US); Omesh Tickoo, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 889 days.

(21) Appl. No.: 17/129,981

(22) Filed: Dec. 22, 2020

(65) Prior Publication Data

US 2021/0133633 A1    May 6, 2021

(51) Int. Cl.
*G05B 13/02*    (2006.01)
*G06N 20/00*    (2019.01)

(52) U.S. Cl.
CPC ........... *G06N 20/00* (2019.01); *G05B 13/029* (2013.01)

(58) Field of Classification Search
CPC ........ G06N 20/00; G06N 3/008; G06N 3/045; G06N 3/047; G06N 5/01; G06N 5/02; G06N 7/01; G06N 20/20; G06N 3/084; G06N 3/006; G06N 5/043; G05B 13/029; G05B 2219/39146; G05B 2219/32115; B25J 5/007; B25J 9/162; B25J 9/1628;

(Continued)

(56) References Cited

U.S. PATENT DOCUMENTS 8,892,253 B2 * 11/2014 Park .................... G05D 1/0274
                                                                901/1
11,416,743 B2 *  8/2022 Baughman ............... G06N 3/08
(Continued)

FOREIGN PATENT DOCUMENTS

KR    20190141576 A    12/2019

OTHER PUBLICATIONS

Esterle, Lukas, "Goal-Aware Team Affiliation in Collectives of Autonomous Robots", IEEE, Sep. 3-7, 2018, pp. 90-99, 2018 IEEE 12th International Conference on Self-Adaptive and Self-Organizing Systems (SASO), Trento, Italy.

(Continued)

*Primary Examiner* — Bhavesh V Amin
*Assistant Examiner* — Esvinder Singh
(74) *Attorney, Agent, or Firm* — Viering, Jentschura & Partner mbB

(57) ABSTRACT

A controller for an automated machine may include including: one or more processors configured to: determine that a group affiliation of the automated machine switched from a first group of automated machines to a second group of automated machines, the first group of automated machines being assigned to one or more first tasks, the second group of automated machines being assigned to one or more second tasks; generate a message for one or more network devices of the second group of automated machines in accordance with a communication protocol, the message including information about a task performing model of the automated machine, the task performing model being based on a result of performing at least one task of the one or more first tasks by the automated machine.

18 Claims, 11 Drawing Sheets

(58) Field of Classification Search
CPC ........ B25J 9/163; B25J 9/1656; B25J 9/1661; B25J 11/0045; B25J 11/007; B25J 11/009; G06Q 10/0633; G06Q 10/06316; H04L 67/104
See application file for complete search history.

(56) References Cited

U.S. PATENT DOCUMENTS

| | | | |
|---|---|---|---|
| 2010/0145514 A1* | 6/2010 | Kim .................. | B25J 9/161 |
| | | | 700/248 |
| 2019/0034892 A1* | 1/2019 | Smith ................. | G06Q 40/06 |
| 2020/0019821 A1* | 1/2020 | Baracaldo-Angel ....................... | |
| | | | H04L 63/1441 |
| 2020/0050995 A1* | 2/2020 | Ramanand ......... | G06Q 10/1097 |
| 2020/0094411 A1* | 3/2020 | Tan .................. | B25J 9/1661 |
| 2020/0166952 A1* | 5/2020 | Wang ............... | G05D 1/0289 |
| 2021/0019665 A1* | 1/2021 | Gur .................. | G06N 20/00 |
| 2021/0178589 A1* | 6/2021 | Yamashita .......... | B25J 9/162 |
| 2021/0209483 A1 | 7/2021 | Bose et al. | |
| 2021/0373576 A1* | 12/2021 | Sohn ................ | G05D 1/0297 |
| 2022/0105622 A1* | 4/2022 | Sohmshetty ......... | B25J 9/0084 |
| 2023/0341873 A1* | 10/2023 | Paik ................. | B25J 9/0084 |

OTHER PUBLICATIONS

Extended European Search Report issued for the corresponding European patent application No. 21 19 5509, dated Mar. 4, 2022, 7 pages (for informational purposes only).

* cited by examiner

AUTONOMOUS MACHINE KNOWLEDGE TRANSFER

TECHNICAL FIELD

Various aspects of this disclosure generally relate to methods and systems of knowledge transfer among autonomous machines, and controllers and code segments thereof.

BACKGROUND

For various tasks, autonomous machines are applicable as replacement for humans, assistance for humans and providers for other services. Among others, autonomous machines are employed in industrial environments, such as fabrication, or delivery environments. The capability of such autonomous machines is under constant development and research. Among others, various demands are directed to solve more complex and comprehensive tasks by autonomous machines, as well as reducing the effort of their employment, and improve their efficiency.

BRIEF DESCRIPTION OF THE DRAWINGS

In the drawings, like reference characters generally refer to the same parts throughout the different views. The drawings are not necessarily to scale, emphasis instead generally being placed upon illustrating the exemplary principles of the disclosure. In the following description, various exemplary embodiments of the disclosure are described with reference to the following drawings, in which.

DESCRIPTION

Figure 1:
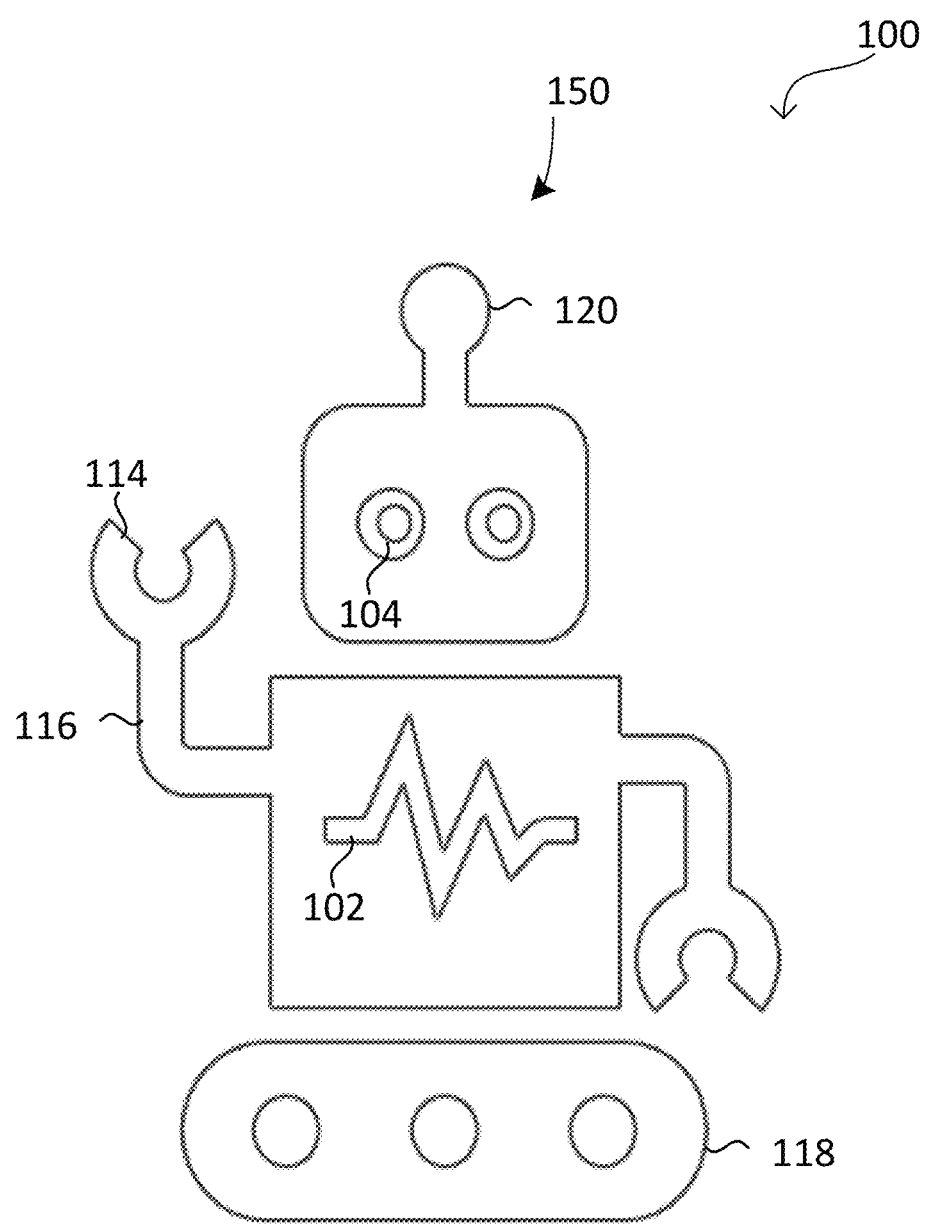
FIG. 1 shows an example of a machine in accordance with various aspects of the present disclosure.

The following detailed description refers to the accompanying drawings that show, by way of illustration, exemplary details and aspects in which the present disclosure may be practiced.

The word "exemplary" is used herein to mean "serving as an example, instance, or illustration". Any aspect or design described herein as "exemplary" is not necessarily to be construed as preferred or advantageous over other aspects or designs.

Throughout the drawings, it should be noted that like reference numbers are used to depict the same or similar elements, features, and structures, unless otherwise noted.

The phrase "at least one" and "one or more" may be understood to include a numerical quantity greater than or equal to one (e.g., one, two, three, four, [ . . . ], etc.). The phrase "at least one of" with regard to a group of elements may be used herein to mean at least one element from the group consisting of the elements. For example, the phrase "at least one of" with regard to a group of elements may be used herein to mean a selection of: one of the listed elements, a plurality of one of the listed elements, a plurality of individual listed elements, or a plurality of a multiple of individual listed elements.

The words "plural" and "multiple" in the description and in the claims expressly refer to a quantity greater than one. Accordingly, any phrases explicitly invoking the aforementioned words (e.g., "plural [elements]", "multiple [elements]") referring to a quantity of elements expressly refers to more than one of the said elements. For instance, the phrase "a plurality" may be understood to include a numerical quantity greater than or equal to two (e.g., two, three, four, five, [ . . . ], etc.).

The phrases "group (of)", "set (of)", "collection (of)", "series (of)", "sequence (of)", "grouping (of)", etc., in the description and in the claims, if any, refer to a quantity equal to or greater than one, i.e., one or more. The terms "proper subset", "reduced subset", and "lesser subset" refer to a subset of a set that is not equal to the set, illustratively, referring to a subset of a set that contains less elements than the set.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in form of a pointer. The term "data", however, is not limited to the aforementioned examples and may take various forms and represent any information as understood in the art.

The terms "processor" or "controller" as used herein may be understood as any kind of technological entity that allows handling of data. The data may be handled according to one or more specific functions that the processor or controller may execute. Further, a processor or controller as used herein may be understood as any kind of circuit, e.g., any kind of analog or digital circuit. A processor or a controller may thus be or include an analog circuit, digital circuit, mixed-signal circuit, logic circuit, processor, microprocessor, Central Processing Unit (CPU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

The term "memory" as used herein may be understood as a computer-readable medium (e.g., a non-transitory computer-readable medium), in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, 3D XPoint™, among others, or any combination thereof. Registers, shift registers, processor registers, data buffers, among others, are also embraced herein by the term memory. The term "software" refers to any type of executable instruction, including firmware.

Unless explicitly specified, the term "transmit" encompasses both direct (point-to-point) and indirect transmission (via one or more intermediary points). Similarly, the term "receive" encompasses both direct and indirect reception. Furthermore, the terms "transmit," "receive," "communicate," and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where radio-layer components carry out the physical transmission and reception, such as radio frequency (RF) transceivers and antennas, and the processors or controllers perform the logical transmission and reception over the software-level connection. The term "communicate" encompasses one or both of transmitting and receiving, i.e., unidirectional or bidirectional communication in one or both of the incoming and outgoing directions. In general, the term "communicate" may include the exchange of data, e.g., unidirectional or bidirectional exchange in one or both of the incoming and outgoing directions. The term "calculate" encompasses both 'direct' calculations via a mathematical expression/formula/relationship and 'indirect' calculations via lookup or hash tables and other array indexing or searching operations.

A "machine" may be understood to include any type of mechanical structure that uses (e.g., electrical) power to alter its environment, to apply forces, to control movement and/or to perform an intended action, e.g., a mechanical structure programmable by a computer. By way of example, a machine may be a driven object with a combustion engine, a reaction engine, an electrically driven object, a hybrid driven object, or a combination thereof. A machine may be or may include a humanoid machine, a non-humanoid machine, an agricultural machine, a machine tool, a moving machine, a stationary machine, a drone, an industrial machine, a medical operating machine, a collectively operating machine, a ground machine, an aerial machine, an aquatic machine, or a mixture thereof, among others.

A "ground machine" may be understood to include any type of machine, as described above, which is configured to traverse the solid ground, e.g., within a building, as part of a production line, on a street, on a road, on a track, off-road, etc. An aerial machine may be understood to include any type of machine, as described above, which is configured lift itself, e.g., to fly or hover.

An "aquatic machine" may be understood to include any type of machine, which is configured to travel on, just above the surface or below the waterline. It may float, be a submersible or travel upon the surface of the water as in a hydrofoil.

The term "automated machine" as used herein (also referred to as a at least partially autonomous machine or as robot) may describe a machine capable of managing one or more tasks (also referred to as task performance) at least partially without human intervention, input, and/or control. Examples of the automated machine may include a hybrid machine, a human assisted machine and/or an autonomous machine. The term "autonomous machine" as used herein (also referred to as autonomous robot) may describe a (e.g., automated) machine capable of managing one or more tasks (also referred to as task performance) without human intervention, input, and/or control.

Exemplary components of managing task may include: managing one or more physical tasks (also referred to as task management), planning the task performance, organizing the task performance, scheduling the task performance, switching between two tasks, competing for one or more task, assigning one or more tasks, completing one or more tasks, reporting about completion of the one or more tasks, negotiation of the allocation of one or more tasks (e.g., between multiple autonomous machines), monitoring the progress of one or more tasks, navigate the autonomous machine to one or more positions of one or more tasks (e.g., at which the one or more task require a physical manipulation), etc. References made herein to robots or automated machines may be understood as exemplarily and may analogously apply to any type of autonomous machine, and vice versa. References made herein with regard to one or more autonomous machines may analogously apply to one or more automated machines. According to various aspects, the task management may be collaborative, e.g., when multiple robots are allocated to one or more tasks. The robots implementing the collaborative task management may be configured to exchange data related to the task management.

The task performance may include processing one or more workpieces, e.g., by adding material to the workpiece, removing material from the workpiece, transforming the workpiece and the like. The autonomous machine may implement one or more task performance models, e.g., a respective controller of the autonomous machine may implement the one or more task performance models. A task performance model may be configured to control the task performance by the autonomous machine based on input data, e.g., to convert the input data into control instructions. The controller may be configured to transmit the control instructions within the autonomous machine, e.g., in accordance with an in-machine communication protocol (e.g., a fieldbus communication protocol) and/or to one or more actuators of the autonomous machine. Generally, a task performance model may be (e.g., at least in part) rule based and/or may be (e.g., at least in part) based on machine learning.

Examples of the input data may include: data that one or more of the sensors of the autonomous machine sensed, data that the autonomous machine stores (e.g., in a database), data indicating instructions provided to the autonomous machine (e.g., data that an operator or a group leader receives), data about an affiliation of the autonomous machine to a group (also referred to as group affiliation), data about an assignment of the autonomous machine to one or more tasks of the group, data exchanged between multiple autonomous machines (e.g., data transmitted from another autonomous machine of the group), and/or data about a mission (also referred to as mission data). The control instructions may be understood as in-machine instructions to control one or more actuators of the autonomous machine. Examples of the one or more actuators of the autonomous machine may include: one or more actuators configured to cause a motion of the autonomous machine, one or more actuators configured to actuate a tool of the autonomous machine, one or more actuators configured to move the tool (also referred to as effector) of the autonomous machine (e.g., relative to the one or more actuators configured to cause a motion of the autonomous machine), one or more actuators being part of the kinetic chain (e.g., a robotic arm) of the autonomous machine.

For example, the task performance may be based on sensed data (also referred to as sensing result, sensor data, or as sensing data), e.g., measurements by one or more sensors of the autonomous machine or measurements by one or more sensors external to the autonomous machine (e.g., one or more sensors of another autonomous machine). For example, the task performance may be based on information about the environment of the autonomous machine, e.g., information that the one or more sensors of the autonomous machine sensed or information that one or more external sensors sensed.

Alternatively, the task performance may be based on a progress of performing one or more tasks that the autonomous machine performs. For example, one or more sensors of the autonomous machine or the one or more external sensors may be configured to sense the progress of performing the one or more tasks that the autonomous machine performs. For example, task performance may include navigating the machine according to one or more positions, at which the machine performs one or more tasks.

Performing one or more tasks may include one or more actions of the autonomous machine, e.g., one or more spatially distributed actions (e.g., a spatial sequence of actions) and/or one or more spatially chronological actions (e.g., in a chronologic sequence of operations). The spatial distribution of multiple actions (also referred to as machine actions) may indicate, where (i.e., with which spatial relation) and/or in which direction the autonomous machine provides the one or more actions, i.e. in which corresponding spatial position (i.e. position and/or orientation) the autonomous machine or its tool is located.

The one or more tasks may be represented (e.g., logically) by data (also referred to as mission data). A mission may refer to one task or a group of multiple tasks, which are related to each other, e.g., by task subject or logically related to each other (for example, tasks directed to the fabrication of a certain product, tasks directed to the exploration of a certain are, and the like). The mission data may be a formal representation of the mission. Examples of the mission data may include: data identifying each task (also referred to as task identifier), data organizing each task (e.g., spatial and/or chronological data), data indicating the criteria under which a task is fulfilled, data indicating goals of each task, data identifying criteria for triggering, terminating, or maintaining a task, etc. Furthermore, the mission data may include a mission logic, which logically links tasks, priorities, criteria, conditions and/or tasks and/or which implements a sequence (e.g., a flow chart), according to which the mission is executed. For example, the mission logic may organize the mission hierarchically, e.g., into hierarchical levels, hierarchical groups, subtasks, and the like. For example, a task may include multiple subtasks on a lower hierarchical level, which may be, but not need to be, prioritized, task subject based and/or conditional. Viewed from the hierarchical level of the subtask, the subtask may also be referred to as task, and may include, but not need to include, multiple subtasks. For example, the mission logic may organize the mission in accordance with conditional aspects and/or task subject aspects. For example, the mission logic may define conditional tasks, e.g., by defining conditions/requirements to be fulfilled for starting a task performance and/or for ending a task performance.

Herein the term "collaborate", "collaborative", "collaboration" refers to entities, such as devices (a plurality of autonomous machines), methods and functions, as examples, participating to accomplish a mission. Examples of the collaborative entities may include various types of agents or actors, such as automated machines (e.g., partially of fully autonomous machines), humans, non-automated machines, or non-autonomous machines. Multiple entities (e.g., autonomous machines) participating in the mission may be affiliated (e.g., assigned) to a group (herein also referred to as group, swarm or as team), e.g., being members (also referred to as agents or as nodes) of the group. Multiple autonomous machines participating in the mission may be affiliated (e.g., assigned) to a group of autonomous machines (herein also referred to as group, swarm or as team), e.g., being members (also referred to as agents or as nodes) of the group of autonomous machines. Each group (e.g., of autonomous machines) may be entrusted with one or more missions. References made herein with respect to a group of autonomous machines may analogously apply to a group of entities, e.g., including various types of agents or actors, such as automated machines (e.g., partially of fully autonomous machines), humans, non-automated machines, or non-autonomous machines.

The autonomous machine may be configured to collaborate with one or more other autonomous machine, e.g., by implementing one or more protocols (also referred to as collaboration protocols). Examples of collaboration protocols may include: a protocol for group management (also referred to as group management protocol), a protocol for communication (e.g., data exchange) between members of a group of collaborating autonomous machines (also referred to as group communication protocol), a protocol for managing tasks of the mission (also referred to as task management protocol).

Generally, a protocol may define rules that indicate the format, syntax, semantics and/or synchronization of information, e.g., of information transfer (e.g., exchange), information storage, information processing, and the like. For example, the autonomous machine may form, join and/or leave a group in accordance with the group management protocol. For example, the autonomous machine may be configured to communicate with other members of the group in accordance with the group communication protocol. For example, the autonomous machine may be configured to exchange sensed data or exchange model data with other members of the group in accordance with the group communication protocol (also referred to as data exchange protocol). For example, a group identifier used to route a message generated in accordance with the group communication protocol to the group.

The automated machine may be configured to broadcast the message to all members of the group, and/or a member identifier or topical filter may route the message to individual members of the group. For example, the autonomous machine may be configured to manage the task performance in accordance with the task management protocol, e.g., synchronizing mission data and/or the status (e.g., the progress and/or accomplishment) of one or more tasks of the mission.

The term "target information" may indicate the respective information of interest about the environmental property. The target information may include various types of information about the environment of the sensor, which are based on the sensing process that the sensor performs, e.g., a result thereof. According to various aspects, the target information may include information about one or more logic, geometric, kinematic, mechanical, radiometric (e.g., photometric), thermodynamically, electrical and/or chemical properties of the environment of the sensor, which are based on the sensing process that the sensor performs, e.g., on a result thereof. This is reflected by the type of the target information, which may be a logical type, geometrical type, kinematical type, mechanical type, radiometrical type (e.g., photometric type), thermodynamical type, electrical type and/or chemical type.

The term "result" with regard to a sensing process (also referred to as sensing result or as result of the sensing process) may refer to an interim stage of data that the sensing chain processes and/or to the target information as output of the processing chain. Examples of the sensing result may include: sensor raw data, an aggregation of raw data, pre-processed (e.g., filtered and/or converted) raw data, a quantized result of processing the sensor raw data, e.g., including numerical information about the sensed property (e.g., one or more values of the sensed property), a classified result of processing the sensor raw data, an estimation made based on the raw data (e.g., output of a model), etc. Examples of the result of an image acquisition as sensing process, may include pixel raw data, the image data based on the raw data, a video, the result of an object recognition based on the image data, a spectral composition, a light intensity value, a distance determined based on the image data, etc.

Various aspects herein may utilize one or more machine learning models to perform or control functions of the machine (or other functions described herein). The term "model" used herein may be understood as any kind of algorithm, which provides output data based on input data provided to the model (e.g., any kind of algorithm generating or calculating output data based on input data). A computing system may execute a machine learning model to progressively improve performance of a specific task. In some aspects, parameters of a machine learning model may be adjusted during a training phase based on training data. A trained machine learning model may be used during an inference phase to make estimations or decisions based on input data. In some aspects, the trained machine learning model may be used to generate additional training data. An additional machine learning model may be adjusted during a second training phase based on the generated additional training data. A trained additional machine learning model may be used during an inference phase to make estimations or decisions based on input data.

The machine learning models described herein may take any suitable form or utilize any suitable technique (e.g., for training purposes). For example, any of the machine learning models may utilize supervised learning, semi-supervised learning, unsupervised learning, or reinforcement learning techniques.

In supervised learning, the model may be built using a training set of data including both the inputs and the corresponding desired outputs (illustratively, each input may be associated with a desired or expected output for that input). Each training instance may include one or more inputs and a desired output. Training may include iterating through training instances and using an objective function to teach the model to estimate the output for new inputs (illustratively, for inputs not included in the training set). In semi-supervised learning, a portion of the inputs in the training set may be missing the respective desired outputs (e.g., one or more inputs may not be associated with any desired or expected output).

In unsupervised learning, the model may be built from a training set of data including only inputs and no desired outputs. The unsupervised model may be used to find structure in the data (e.g., grouping or clustering of data points), illustratively, by discovering patterns in the data. An unsupervised learning model may implement one or more techniques including, e.g., self-organizing maps, nearest-neighbor mapping, k-means clustering, and singular value decomposition.

Reinforcement learning models may include positive feedback (also referred to as reward) or negative feedback to improve accuracy. A reinforcement learning model may attempt to maximize one or more objectives/rewards. A reinforcement learning model may implement one or more techniques, e.g., including, e.g., Q-learning, temporal difference (TD), and/or deep adversarial networks.

Various aspects described herein may utilize one or more classification models. In a classification model, the outputs may be restricted to a limited set of values (e.g., one or more classes). The classification model may output a class for an input set of one or more input values. An input set may include sensor data, such as image data, radar data, LIDAR data and the like. A classification model as described herein may, for example, classify environmental conditions, such as weather conditions and the like. References herein to classification models may contemplate a model that implements, e.g., any one or more of the following techniques: linear classifiers (e.g., logistic regression or naive Bayes classifier), support vector machines, decision trees, boosted trees, random forest, neural networks, or nearest neighbor.

Various aspects described herein may utilize one or more regression models. A regression model may output a numerical value from a continuous range based on an input set of one or more values (illustratively, starting from or using an input set of one or more values). References herein to regression models may contemplate a model that implements, e.g., any one or more of the following techniques (or other suitable techniques): linear regression, decision trees, random forest, or neural networks.

A machine learning model described herein may be or may include a neural network. The neural network may be any kind of neural network, such as a convolutional neural network, an autoencoder network, a variational autoencoder network, a sparse autoencoder network, a recurrent neural network, a deconvolutional network, a generative adversarial network, a forward thinking neural network, a sum-product neural network, and the like. The neural network may include any number of layers. The training of the neural network (e.g., adapting the layers of the neural network) may use or may be based on any kind of training principle, such as backpropagation (e.g., using the backpropagation algorithm).

For example, the controller of an autonomous machine may be configured to train the task performance model based on training data. The training data may include the control instructions, a result of the task performance (also referred to as actual result) and/or a predefined result (also referred to as expected result or target result). For example, the controller may be configured to determine the result of the task performance by sensing the environment of the machine. For example, the predefined result may represent an optimum result or a range of results that are acceptable. Said more generally, the training data may indicate whether the result of the task performance fulfills a predefined criterion, e.g., by comparing the actual result with the predefined result. For example, the criterion may be fulfilled when a deviation of the actual result from the predefined result is zero.

Generally, the actual result and/or the predefined result may be parameterized, e.g., represented by data (also referred to as result data) including one or more parameters as information about the result. For example, the result data may include sensed parameters, such as physical, electrical and/or chemical properties of the result.

Aspects detailed herein provide for a seamless transfer of knowledge (e.g., learned knowledge) between autonomous machines (e.g., robots, drones, or other autonomous agents) from one group to another group with different dynamics. This improves the capability to have a high signal/noise ratio of filtering appropriate learnt knowledge along with provenance tracking (that may be monetized). Furthermore, curried evaluations may be tracked for auditability, provenance, etc., and may be instantiated as "e-assets" (electronic asset) that is sold and/or exchanged in an e-market (electronic market). According to various aspects, a transactions tracking may be centralized or distributed public ledger based (e.g. by a blockchain).

According to various aspects, it was recognized that a challenge in various distributed collaborative autonomous robot scenarios includes the efficient transfer of knowledge (e.g., learned knowledge), e.g., when robots get on-boarded or migrated (for load balancing, complementary sensing and/or offloading) across one or more domains. An exemplary scenario includes an automated factory, in which 2500 or more autonomous robots are operating equipped with a tool of various types (e.g. glue guns, screw drivers, etc.). Multiple of these robots may work individually or collaboratively as team to accomplish a mission, e.g., to accomplish a car assembly. Each of the robots may be applying a reward-based reinforcement learning based on past task accomplishment and past working relationship with peer agents. When required, e.g., when the mission authority wants to on-board a new robot into an existing group, or wants to migrate a robot from an existing group to another existing group, the following challenges occur. If the robots are not grouped, the learning from a given robot may be transferred seamlessly to another new on-boarding one or a failover scenario take over. Transfer learning may be applicable but does not provide a full knowledge transfer especially in terms of eliminating false positives and cleansing the learnt knowledge. When the robots are grouped, and a model is developed per group, scaling to a large set of robots may require constant feedback from a process expert to determine and redefine machine grouping rules based on learnt knowledge characteristics.

In another scenario, e.g., including a drone delivery service, a group of drones may cover a region with the delivery service (e.g. a town with rainy weather, slopes, etc.). Some of these drones may be redeployed to another region (e.g. having sunny weather, plains, etc.). In this scenario, the challenge may include to appropriately transfer cleansed learnt knowledge.

According to various aspects, a collaborative brachiation transfer learning (CBTL) for autonomous machines is provided that addresses the above challenges. Use of aspects of this disclose may be detected through operation pattern, capability specs, communication pattern, initialization details and configuration details (e.g., role definition).

FIG. 1 shows an example of an autonomous machine 150 in accordance with various aspects 100 of the present disclosure. In some aspects, the machine 150 may include one or more processors 102; one or more sensors 104; one or more effectors 114; one or more kinetic chains 116 (e.g., holding an effector); one or more propulsion devices 118; and/or one or more communication devices 120.

A sensor (also referred to as detector) may be understood as a transducer that is configured to qualitatively or quantitatively sense a property of its environment (also referred to as environmental property) corresponding to the sensor type, e.g., a geometric, kinematic, mechanical, radiometric (e.g., photometric), thermodynamically, electrical and/or chemical property. The sensed quantity is the physical quantity, to which a sensing process using the sensor is directed. Depending on the complexity of the sensor's environment to be sensed, the sensor may be configured to distinguish only between two states of the sensed quantity or to distinguish between more than two states of the sensed quantity. A sensor may be part of a specific processing chain (also referred to as sensing chain), which includes a corresponding infrastructure (e.g., including processor, storage medium and/or bus system or the like). The sensing chain may be configured to operate the corresponding sensor (e.g., water sensor, pressure sensor and/or actuation sensor), to process its sensed quantity as input and to provide a target information as output, which represents the input. According to various aspects, the one or more processors 102 (e.g., being components of a controller) may be configured to implement at least a part of the sensing chain. It is noted that the sensing chain may optionally include (e.g., wireless and/or wired) data exchange, e.g., between various nodes of a network based sensing chain. For example, the sensing chain may be configured to output the sensing result via an electrical signal (also referred to as sensor signal) or communicate the sensing result (e.g., wirelessly and/or via wire) to another component of the sensing chain or to a further communication device (e.g., of a further autonomous machine).

According to various aspects, the sensing result (also referred to as sensor data) may include sensor raw data, quantized information about the sensed property (e.g., one or more values of the sensed property), or a result of processing the information about the sensed property and/or the sensor raw data. For example, the result of an image acquisition as exemplarily sensing process, may include pixel raw data, the image data based on the raw data, the result of an object recognition based on the image data, a spectral composition, a light intensity value, a distance determined based on the image data, etc. The result of the sensing process may include various types of information about an environment of the sensor, which are based on the sensing process that the sensor may perform. According to various aspects, the result of the sensing process may include information about one or more logic, geometric, kinematic, mechanical, radiometric (e.g., photometric), thermodynamically, electrical and/or chemical properties of the environment of the sensor, which are determined based on the sensing process that the sensor may perform. Analogously, the type of information may be a logic type, geometric type, kinematic type, mechanical type, radiometric type (e.g., photometric type), thermodynamic type, electric type and/or chemical type.

According to various aspects, the sensing chain (e.g., the one or more processors 102) may be configured to obtain the same sensing result by sensing various environmental properties and/or various sensors may be configured to obtain the same sensing result. For example, the sensing chain (e.g., the one or more processors 102) may be configured to determine a distance of the autonomous machine from an object based on a radar sensor, a LIDAR sensor, or also by processing image data from a camera, e.g., stereographic image data. For example, the sensing chain (e.g., the one or more processors 102) may be configured to determine a temperature based on a resistive temperature sensor or based on a radiometric sensor, e.g., based on a spectral composition that the radiometric sensor sensed.

Generally, each sensor 104 may be configured to sense an actual condition (also referred to as actual state), e.g., the condition at the point of time of the sensing process. Examples of the one or more sensors 104 may be configured to sense the actual condition of the machine 150 (also referred to as operational condition), wherein other examples of the one or more sensors 104 may be configured to sense the actual condition of the environment of the machine 150 (also referred to as environmental condition), e.g., to which the one or more sensors 104 are exposed. Examples of sensing the actual condition of the machine 150 may include: sensing the temperature of the machine 150, sensing the position of an effector, sensing the position of one or more nodes of the kinetic chain 116, sensing the position and/or orientation of the machine 150, sensing the speed of the machine, sensing an operation and/or status of the effector, e.g., sensing a force that the effector may generate, sensing a fluid flow that the effector may generate, generating an electrical power output that the effector may generate.

Examples of sensing the environmental condition of the machine 150 may include: sensing an object in the vicinity of the machine 150, e.g., one or more properties of the object; sensing a progress of the task performance; sensing radiation in the vicinity of the machine 150, e.g., electromagnetic radiation or particle radiation; sensing sound/acoustics. Examples of the object may include: the workpiece that machine 150 may process, a human, another machine; a fluid, a gas, a solid. Examples of the properties of the object may include: a distance of the object from the machine; a position of the object; a temperature of the object; a texture of the object; a chemical composition of the object; a movement of the object; etc.

Examples of the one or more sensors 104 include one or more optoelectronic sensors 105 (e.g., providing one or more image acquisition devices), one or more position sensors 106, one or more speed sensors, one or more distance sensors 108, e.g., one or more radar sensors and/or one or more LIDAR sensors, one or more temperature sensors 110, one or more force sensors 112. Examples of the one or more propulsion devices 118 may include one or more ground propulsion devices 118, one or more water propulsion devices 118 and/or one or more air propulsion devices 118.

Exemplary components of a propulsion device 118 may include one or more motors; one or more rollers; one or more tires; one or more continuous tracks; one or more propellers; and the like. Exemplary components of a communication device 120 may include one or more (e.g., wireless and/or wired) transceivers 208, 210, 212; one or more antennas (also referred to as antenna system); one or more amplifiers, one or more filters, one or more modulators, one or more demodulators, one or more baseband-processors, one or more signal processors, one or more memories.

Optionally, one or more components of the autonomous machine 150 may be configured exchangeable (also referred to as exchangeable components). The autonomous machine may be configured to unmount an exchangeable component and mount a further exchangeable component in place of the unmounted component (also referred to as self-change process). For example, at least one effector of the autonomous machine 150 may be configured to as exchangeable component. In this case, the kinetic chain 116 holding the effector may be configured to release (e.g., unmount) the effector and mount another effector (also referred to as change tools).

As outlined below in more detail, the one or more processors 102 may be configured to generate one or more messages in accordance with a (e.g., wireless and/or wired) communication protocol and provide the generated one or more messages to the one or more communication devices 120. The one or more communication devices 120 may be configured to send the one or more messages in accordance with a (e.g., wireless and/or wired) communication protocol. Analogously, the one or more communication devices 120 may be configured to receive one or more messages in accordance with a (e.g., wireless and/or wired) communication protocol and provide the received one or more messages to the one or more processors 102. The one or more processors 102 may be configured to process the one or more messages.

In some aspects, the machine 150 may include a control system 251 (as described with respect to FIG. 2 below). It is appreciated that machine 150 and control system 251 are exemplary in nature and may thus be simplified for explanatory purposes. Locations of elements and relational distances (as discussed above, the figures are not to scale) are provided as examples and are not limited thereto. The control system 251 may include various components depending on the requirements of a particular implementation.

Figure 2:
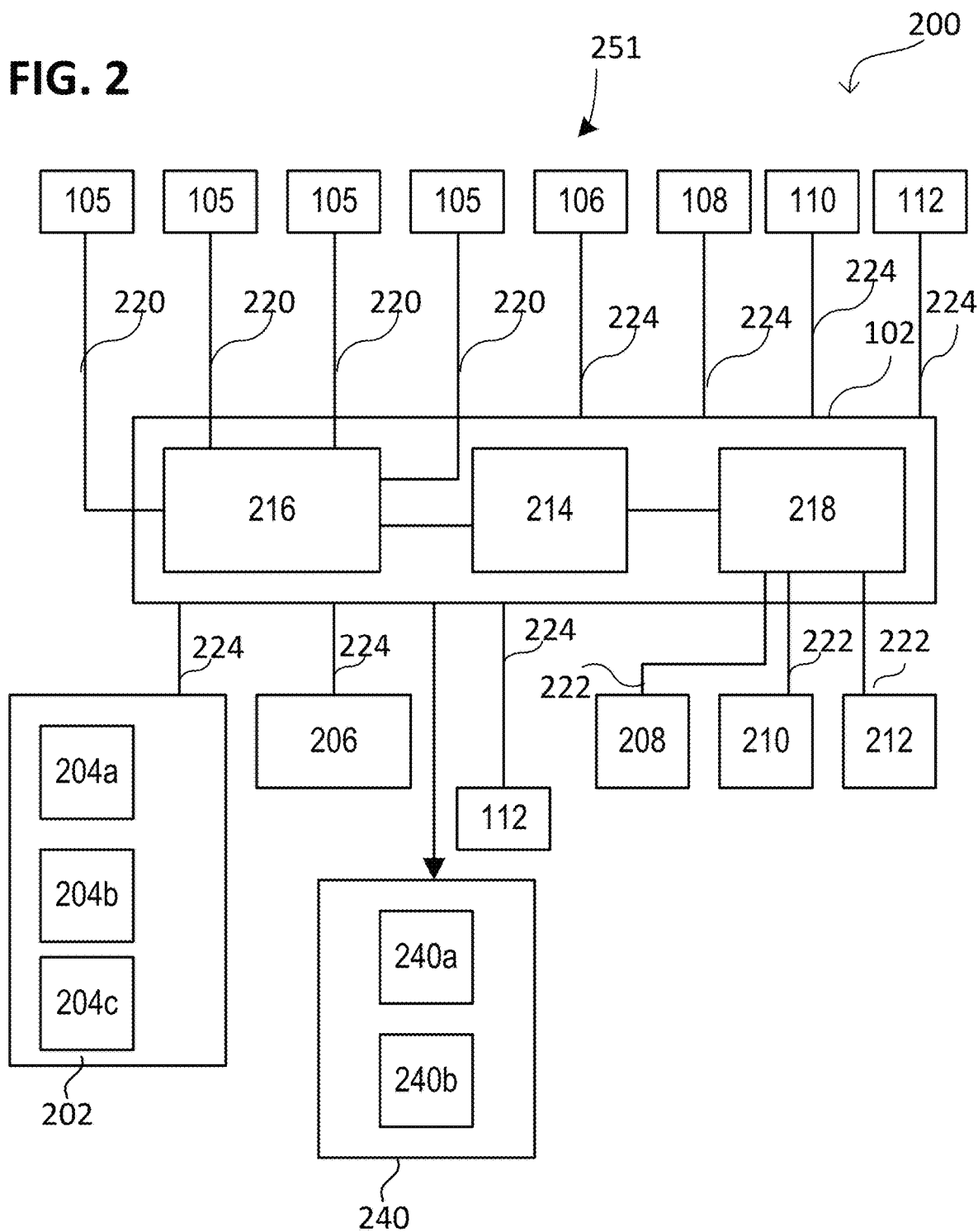
FIG. 2 shows various exemplary electronic components of a control system of the machine in accordance with various aspects of the present disclosure.

FIG. 2 shows various exemplary electronic components of a machine, namely control system 251, in accordance with various aspects 200 of the present disclosure. In some aspects, the control system 251 may include one or more processors 102, one or more image acquisition devices 105 (e.g., one or more cameras), one or more position sensors 106 (e.g., a Global Navigation Satellite System (GNSS), a Global Positioning System (GPS), among others) one or more distance sensors 108, e.g., one or more radar sensors and/or one or more LIDAR sensors, one or more temperature sensors 110, one or more force sensors 112. According to at least one aspect, control system 251 may further include one or more memories 202, one or more map databases 204a, one or more mission databases 204b, one or more models 204c, one or more input/output interfaces 206 (e.g., user interfaces), and/or one or more (e.g., wireless and/or wired) transceivers 208, 210, 212. Exemplary components of the one or more input/output interfaces 206 include one or more displays, one or more touch screens, one or more microphones, one or more loudspeakers, one or more buttons and/or switches, etc.

The (e.g., wireless and/or wired) transceivers 208, 210, 212 may, in some aspects, be configured according to the same, different, or any combination thereof radio communication protocols or standards. By way of example, a (e.g., wireless and/or wired) transceiver (e.g., a first wireless transceiver 208) may be configured in accordance with a Short Range mobile radio communication standard (e.g., Bluetooth, Zigbee, among others). As another example, a (e.g., wireless and/or wired) transceiver (e.g., a second wireless transceiver 210) may be configured in accordance with a Medium or Wide Range mobile radio communication standard (e.g., 3G (e.g., Universal Mobile Telecommunications System—UMTS), 4G (e.g., Long Term Evolution—LTE), and/or 5G mobile radio communication standard in accordance with corresponding 3GPP (3$^{rd}$ Generation Partnership Project) standards, among others). As a further example, a (e.g., wireless and/or wired) transceiver (e.g., a third wireless transceiver 212) may be configured in accordance with a Wireless Local Area Network communication protocol or standard (e.g., IEEE 802.11, 802.11, 802.11a, 802.11b, 802.11g, 802.11n, 802.11p, 802.11-12, 802.11ac, 802.11ad, 802.11ah, among others). The one or more (e.g., wireless and/or wired) transceivers 208, 210, 212 may be configured to transmit signals via the antenna system over an air interface.

In some aspects, the one or more processors 102 may include an application processor 214, an image processor 216, a communication processor 218, a signal processor, and/or any other suitable processing device. Image acquisition device(s) 105 may include any number of image acquisition devices and components depending on the requirements of a particular application. Image acquisition devices 105 may include one or more image capture devices, e.g., cameras, CCDs (charge coupling devices, or any other type of image sensor).

In at least one aspect, the control system 251 may also include one or more data interfaces communicatively connecting the one or more processors 102 to other components of the control system 251. For example, one or more the data interfaces may be configured to exchange data in accordance with a fieldbus communication protocol or another in-machine communication protocol. For example, the one or more data interfaces may include a first data interface, e.g., including any wired and/or (e.g., wireless and/or wired) first link 220 or first links 220 configured to transmit image data that the one or more image acquisition devices 105 acquire to the one or more processors 102 (e.g., to the image processor 216). For example, the one or more data interfaces may include a second data interface, e.g., including any wired and/or (e.g., wireless and/or wired) second link 222 or second links 222 configured to transmit radio transmitted data that the (e.g., wireless and/or wired) transceivers 208, 210, 212 may acquire to the one or more processors 102, e.g., to the communication processor 218. For example, the one or more data interfaces may include a third data interface 224, e.g., including any wired and/or (e.g., wireless and/or wired) third link 224 or third links 224, coupled to the one or more position sensor 106 and/or to the one or more distance sensors 108 and/or to the one or more temperature sensors 110 and/or to the one or more force sensors 112.

Such data transmissions (e.g., exchange) may also include communications (e.g., one-way or two-way) between the machine 150 and one or more other (target) machines in an environment of the machine 150 (e.g., to facilitate coordination of the task performance by, e.g., including the navigation of, the machine 150 in view of or together with other (e.g., target) machines in the environment of the machine 150), or even a broadcast transmission to unspecified recipients in a vicinity of the transmitting machine 150.

One or more of the transceivers 208, 210, 212 may be configured to implement the group communication protocol (e.g., including a data exchange protocol, e.g., a (e.g., wireless and/or wired) data exchange protocol and/or a wired data exchange protocol), and optionally one or more other communication protocols. In some aspects, the group communication protocol may include a proprietary (e.g., wireless and/or wired) communication protocol or may be a proprietary (e.g., wireless and/or wired) communication protocol. In some aspects, the group communication protocol may be an application layer protocol, e.g., defining the format, syntax, and/or semantics of the load part of a message generated in accordance with a (e.g., wireless and/or wired) communication protocol.

Each processor 214, 216, 218 of the one or more processors 102 may include various types of hardware-based processing devices. Exemplary components of each processor 214, 216, 218 may include: a microprocessor, pre-processors (such as an image pre-processor), graphics processors, a central processing unit (CPU), support circuits, digital signal processors, integrated circuits, memory, or any other types of devices suitable for running applications and for sensor data processing and analysis. In some aspects, each processor 214, 216, 218 may include any type of single or multi-core processor, mobile device microcontroller, central processing unit, etc. These processor types may each include multiple processing units with local memory and instruction sets. Such processors may include video inputs for receiving image data from multiple image sensors and may also include video out capabilities.

Any of the processors 214, 216, 218 disclosed herein may be configured to perform certain functions in accordance with program instructions which may be stored in a memory of the one or more memories 202. In other words, a memory of the one or more memories 202 may store software that, when a processor (e.g., the one or more processors 102) executes, controls the operation of the system, e.g., of the control system 251. A memory of the one or more memories 202 may store one or more databases and image processing software, as well as a trained system, such as a neural network, or a deep neural network, for example. The one or more memories 202 may include any number of random access memories, read only memories, flash memories, disk drives, optical storage, tape storage, removable storage and other types of storage.

In some aspects, the control system 251 may further include components such as a speed sensor (e.g., a speedometer) for measuring a speed of the machine 150. The control system may also include one or more accelerometers (either single axis or multiaxis) (not shown) for measuring accelerations of the machine 150 along one or more axes. The control system 251 may further include additional sensors or different sensor types such as an ultrasonic sensor, a thermal sensor, one or more radar sensors 110, one or more LIDAR sensors 112 (which may be integrated in the head lamps of the machine 150), and the like.

The one or more memories 202 may store data, e.g., in a database or in any different format. The one or more processors 102 may be configured to process sensory information (also referred to as sensor data), such as images, radar signals, depth information from LIDAR, temperature values or stereo processing of two or more images) of the environment of the machine 150 together with position information, such as a GPS coordinate, a machine's ego-motion, etc., to determine a current location of the machine 150 relative to the known landmarks, and refine the determination of the machine's location. Certain aspects of this technology may be included in a localization technology such as a mapping and routing model.

The map database 204 may include any type of database storing (digital) map data for the machine 150, e.g., for the control system 251. The map database 204 may include data relating to the position, in a reference coordinate system, of various (e.g., outdoor or indoor) items, including roads, buildings, walls, topographic features (e.g., stairs), geographic features, rooms, points of interest, spatial information of a task, docks, etc. In some aspects, a processor of the one or more processors 102 may download (e.g., some or all) information of the map database 204 over a (e.g., wireless and/or wired) data connection to a communication network (e.g., over a cellular network and/or the Internet, etc.). In some aspects, a processor of the one or more processors 102 may be configured to determine, e.g., form and/or update, (e.g., some or all) information of the map database 204, e.g., based on sensing the environmental condition by the one or more sensors 104. In some aspects, the map database 204 may store a sparse data model including polynomial representations of the environment of the machine 150.

In some aspects, the control system 251 may include a mission database. Exemplary components of the mission database may include mission data, a task list, a task status, a task allocation, achievement parameters, target results, etc. Illustratively, the mission database may provide and/or store information about a mission of the team, to which the machine 150 is affiliated. Some information of the mission database (e.g., some mission data) may be provided to the machine 150, e.g., one or more other members of the team and/or a central mission controlling authority may provide the information of the mission database. The machine 150 may provide some information of the mission database (e.g., some mission data), e.g., to one or more other members of the team and/or to a central mission controlling authority. The machine 150 may update and/or form some information of the mission database (e.g., some mission data), e.g., in accordance with a status of the mission and/or based on a sensing result of the machine 150.

Furthermore, the control system 251 may include a task performance model 204*b*, e.g., an automated system may implement the task performance model 204*b*. By way of example, the control system 251 may include (e.g., as part of the task performance model) a computer implementation of a formal model of the machine or its environment. By way of example, the control system 251 may include (e.g., as part of the task performance model) a safety performance model, a task interpretation model and/or a machine control model. A task performance model may be or include a mathematical model formalizing an interpretation of applicable task performance policies, safety policies, operation policies, mission data, etc., e.g., being applicable to autonomous machines. It is noted that one or more of the detailed components of the task performance model may be implemented monolithically or separately from each other, e.g., by separate applications that the one or more processors may execute.

For example, the safety performance model may be configured to achieve, e.g., three goals: first, the interpretation of safety policies should be sound in the sense that it complies with how humans interpret the safety policies; second, the interpretation should lead to a useful task performance, meaning it will lead to an agile task performance rather than an overly-defensive task performance which inevitably would confuse other agents (e.g., humans and/or machines) and will obstruct accomplishing the mission and in turn limit the scalability of system deployment; and third, the interpretation should be efficiently verifiable in the sense that it can be rigorously proven that the autonomous machine correctly implements the interpretation of the safety policies. The safety performance model, illustratively, may be or include a mathematical model for safety assurance that enables identification and performance of proper responses to dangerous situations such that self-perpetrated accidents can be avoided.

For example, the task interpretation model may be configured to determine a formal formulation of performance steps the machine may perform, e.g., based on information about one or more tasks of the mission allocated to the machine and/or based on the target performance. The conversion may be configured to lead to an efficient task performance and to a result, which meets the target performance as best as possible, e.g., to accomplish the task.

For example, the machine control model may be configured to determine useful actions that the machine may take leading to a useful task performance, e.g., based on the performance steps and/or the model of the machine and/or its environment. For example, the machine control model may generate the control instructions based on a model of the kinetic chain of the machine, the available effectors of the machine, the reachable position of the machine, etc.

The control system 251 may generate data to control or assist to control the engine control unit (ECU) and/or other components of the machine 150 to directly or indirectly control the driving of the machine 150.

In some aspects, the control system 251 may include a driving device 240 configured to drive one or more actuators of the autonomous machine, e.g., one or more actuators of the kinematic chain of the autonomous machine 150 and/or one or more actuators of the one or more propulsion devices 118. For example, the driving device 240 may include one or more amplifiers 240*a* and/or one or more energy storages 240*b*. Examples of energy storages 240*b* may include any storage capable to storing energy (in a certain form, e.g., such as electrically, magnetically, chemically, and the like) and convert the stored energy in electrical power. Examples of the amplifiers 240*a* may include any voltage-to-voltage converter providing an operation voltage of the one or more actuators based on the electrical supply power and based on a control signal received from the one or more processors 102.

As described above, the machine 150 may include the control system 251 as also described with reference to FIG. 2.

The machine 150 may include the one or more processors 102 e.g. integrated with or separate from an engine control unit (ECU) of the machine 150.

The control system 251 may in general generate data to control or assist to control the ECU and/or other components of the machine 150 to directly or indirectly control the driving of the machine 150.

Although the following aspects will be described in association with the above detailed models, any other model may be provided in alternative implementations.

Figure 3:
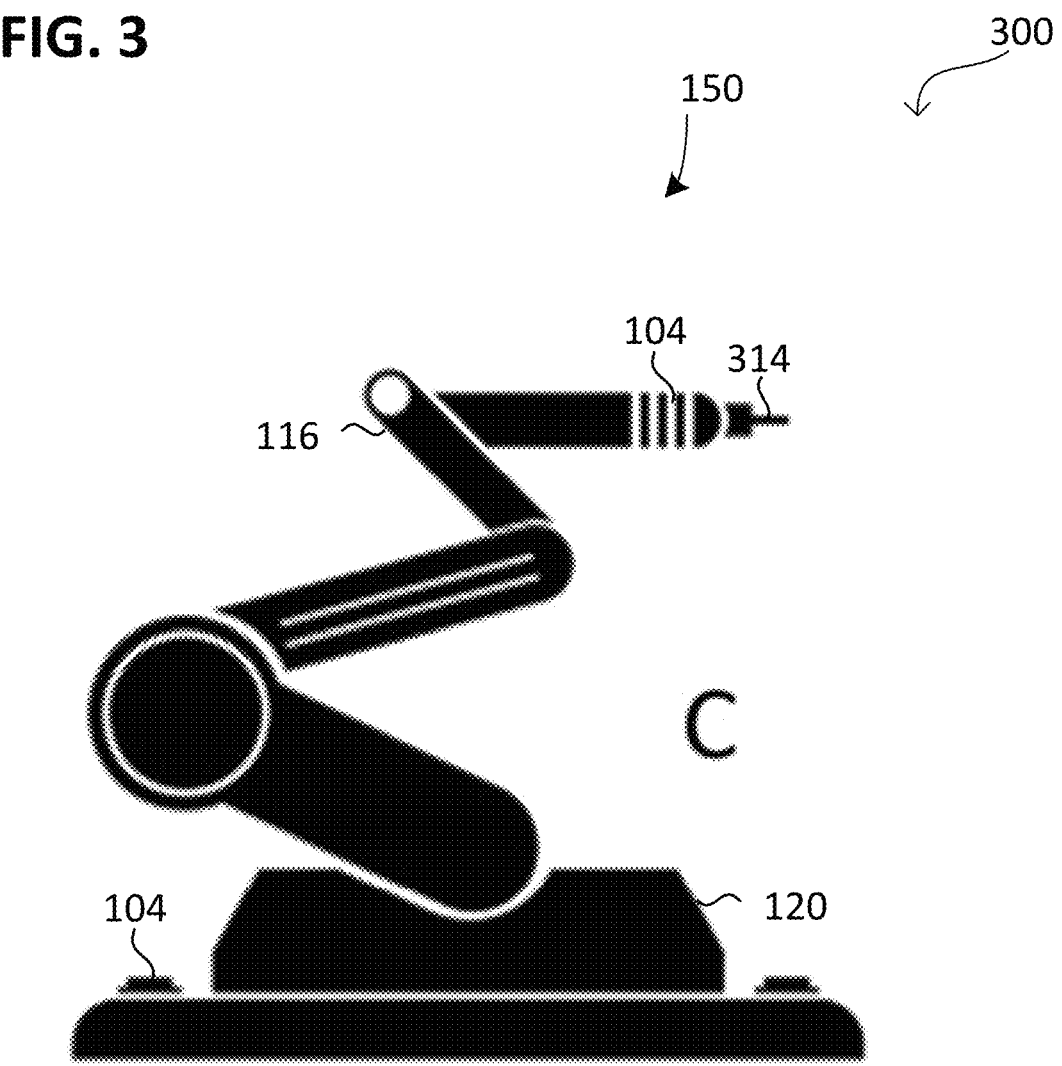
FIG. 3 shows an example of a machine in accordance with various aspects of the present disclosure.
Figure 4:
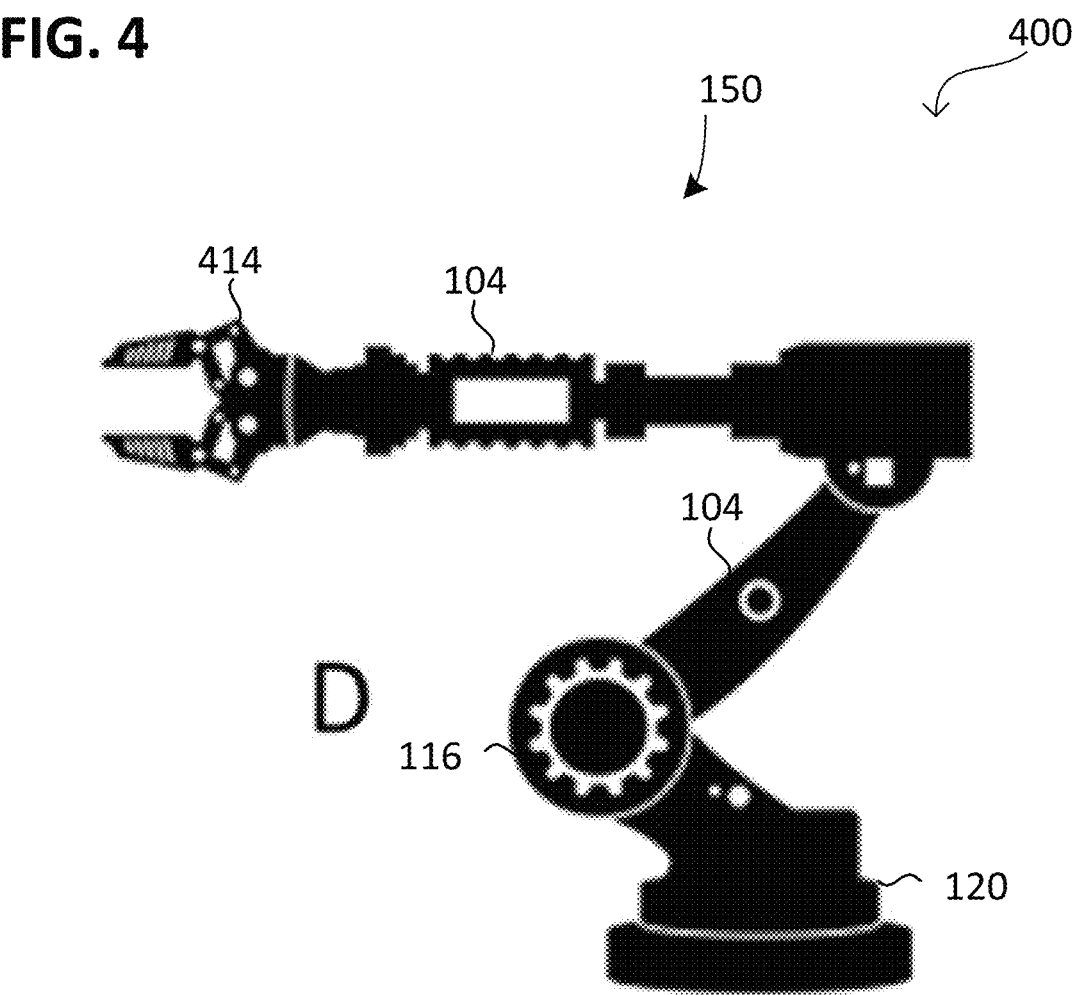
FIG. 4 shows an example of a machine in accordance with various aspects of the present disclosure.

FIGS. 3 and 4 show further examples of autonomous machines 150. FIG. 3 shows a further example of an autonomous machine 150 in accordance with various aspects 300 of the present disclosure, e.g., being configured in accordance with aspects 100 or 200. For example, autonomous machine 150 may include one or more processors 102 (not shown); one or more one or more sensors 104; one or more effectors 114; one or more kinetic chains 116 (e.g., holding an effector); and/or one or more communication devices 120. Machine 150 may be stationary and include a welding device 314 as effector 114.

FIG. 4 shows a further example of an autonomous machine 150 in accordance with various aspects 400 of the present disclosure, e.g., being configured in accordance with aspects 100 or 200. Autonomous machine 150 may include one or more processors 102 (not shown); one or more one or more sensors 104; one or more effectors 114; one or more kinetic chains 116 (e.g., holding an effector); and/or one or more communication devices 120. Machine 150 may be stationary and include a grabber device 414 as effector 114.

Herein, reference is made to various methods', processing chains, operations, computations, logical relations, models and functions, e.g., with respect to autonomous machines. It can be understood that the references made may be analogously apply to a controller and/or code segments implementing the methods, processing chains, operations, computations, logical relations, models and functions.

Figure 5:
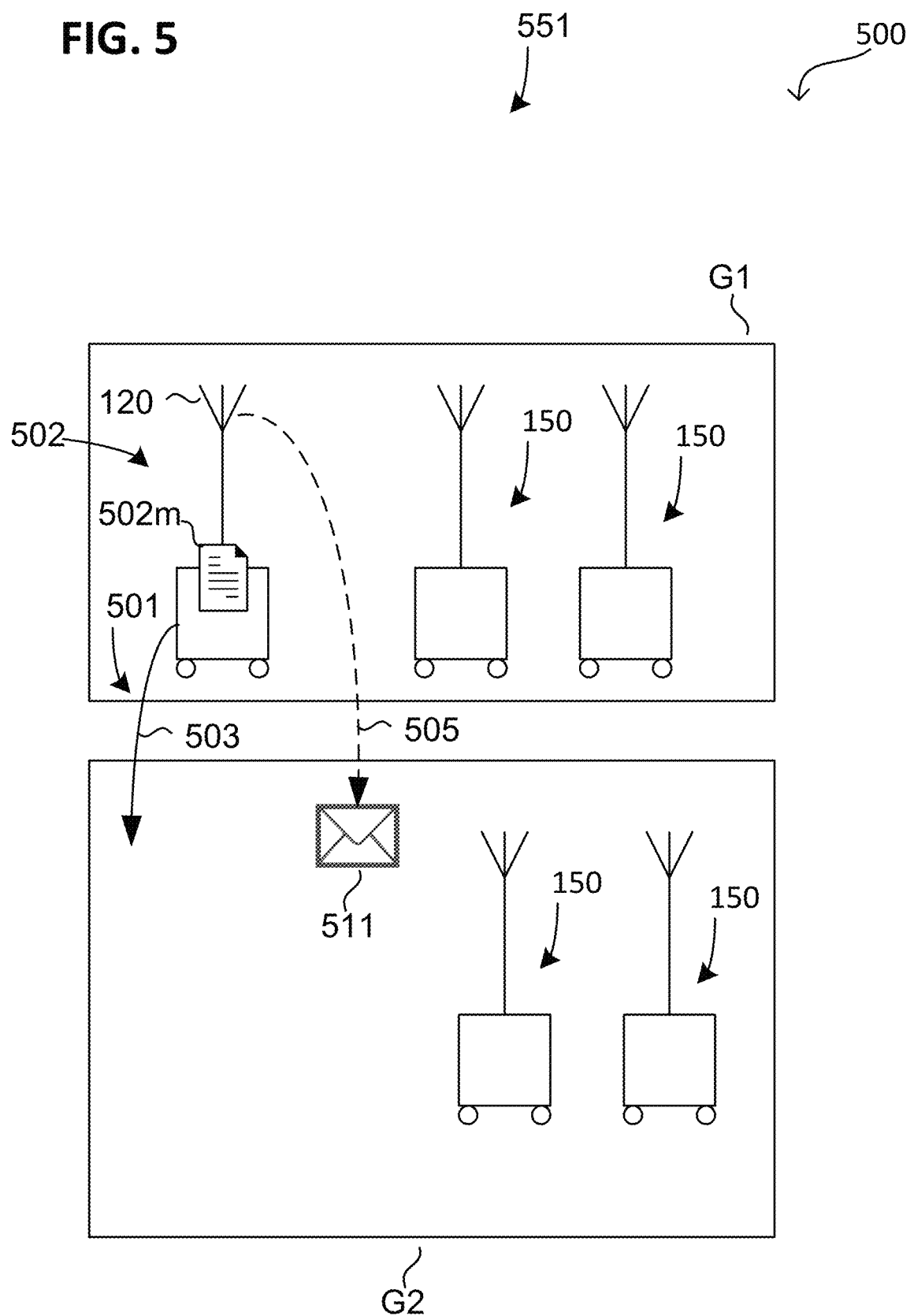
FIG. 5 shows a method in accordance with various aspects of the present disclosure in a schematic diagram.

FIG. 5 shows a method 551 in accordance with various aspects 500 of the present disclosure, in a schematic communication diagram, which may be configured in accordance with one or more of aspects 100 to 400. One or more autonomous machines 150, namely a first autonomous machine 502 (e.g., being selected as a brachiating agent 502) may implement method 551. The brachiating agent 502 may be affiliated (herein also referred to as group affiliation) to a first group (G1) of autonomous machines (herein also referred to as first team or simply G1).

The method 551 may include, in 501, determining, by the brachiating agent 502, a group migration 503 of the brachiating agent 502. The group migration 503 may include that the group affiliation of the brachiating agent 502 switches from the first team G1 to a second group (G2) of autonomous machines (herein also referred to as second team or simply G2). Illustratively, the first team G1 is the source of the group migration 503 (in this case also referred to as source team) and the second team G2 is the target of the group migration 503 (in this case also referred to as target team). The references made to the group migration 503 from G1 to G2 may analogously apply to any other combination of teams providing for a source team and a target team. The same nomenclature applies to the respective missions, tasks and domains of the teams.

The first team G1 may include one or more first autonomous machines 150, which may be assigned to one or more first tasks (herein also referred to as first mission). The second team G2 may include one or more second autonomous machines 150, which may be assigned to one or more second tasks (herein also referred to as second mission).

The method 551 may include, in 501, generating, by the brachiating agent 502, a message 511 (herein also referred to as knowledge transfer message) including information (herein also referred to as knowledge) about a task performing model 502m of the brachiating agent 502. The brachiating agent 502 may address and/or transmit the knowledge transfer message 511 to one or more network devices (e.g., each network device) of the second team G2. For example, the method 551 may include, broadcasting, by the brachiating agent 502, the knowledge transfer message 511 to the second team G2.

The brachiating agent 502 may be part of a specific processing chain (also referred to as knowledge processing chain), which includes a corresponding infrastructure (e.g., including processor, storage medium and/or bus system or the like). The knowledge processing chain may be configured to process the task performance model 502m as input and to provide a target information (herein also referred to as extracted knowledge) as output, which represents the task performing model 502m. According to various aspects, the brachiating agent 502 may include one or more processors 102 (e.g., being components of a controller) being configured to implement at least a part of the knowledge processing chain. It is noted that the knowledge processing chain may optionally include (e.g., wireless and/or wired) data exchange, e.g., between various nodes of a network, e.g., members of the same team and/or between multiple teams, e.g., to or from a server. The knowledge processing chain may be configured to output the extracted knowledge via data and/or to communicate any interim stage of data processed by the knowledge processing chain (e.g., wirelessly and/or per wire) between two components of the knowledge processing chain.

The term "knowledge" with regard to information about a task performing model 502m may refer to any interim stage of data that the knowledge processing chain processed and/or may refer to the extracted knowledge as output of the knowledge processing chain. The knowledge processing chain and examples of the extracted knowledge are outlined in more detail later.

The one or more network devices (e.g., each network device) of the second team G2 may be part of the knowledge processing chain, or may be the recipient of the extracted knowledge. Examples of the network devices of the second team G2 include: one or more second autonomous machines 150 and/or one or more stationary servers being in communication with the second team G2. For example, the one or more stationary servers may implement a central mission controlling authority for the second mission. According to various aspects, the one or more stationary servers may be configured to store, process and/or aggregate the knowledge from one or more brachiating agents 502, and, if desired, provide the result thereof (e.g., the extracted knowledge) to one or more autonomous machines 150 of the first team G1 and/or of the second team G2.

Generally, the state of the task performing model 502m of the brachiating agent 502, e.g., at the time of the group migration 503, may be (e.g., trained) based on a result of performing at least one task of the first mission by the brachiating agent 502. Illustratively, the brachiating agent 502 may collect knowledge (herein also referred to as learning), e.g., by training its task performing model 502m, by the collaborative activity within the first team G1, and may share this knowledge with the second team G2. The brachiating agent 502 may sense the result of performing at least one task of the first mission by the one or more sensors 104s of the brachiating agent 502. The task performing model 502m may be a reinforcement learning model.

Figure 6:
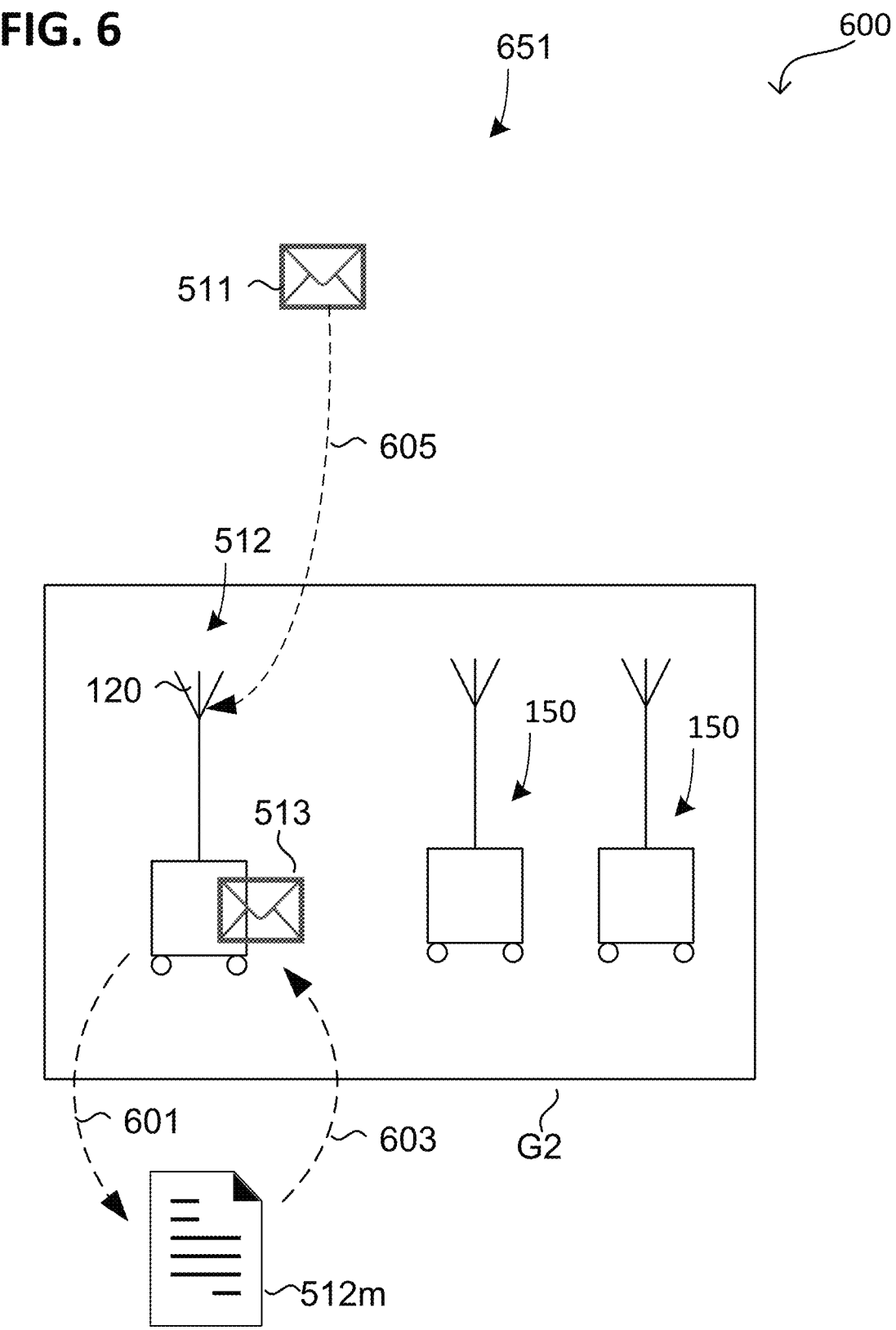
FIG. 6 shows a method in accordance with various aspects of the present disclosure in a schematic diagram.

FIG. 6 shows a method 651 in accordance with various aspects 600 of the present disclosure, in a schematic diagram, which may be configured in accordance with one or more of aspects 100 to 500. One or more autonomous machines 150, namely a second autonomous machine 502 (e.g., being selected as recipient agent 512) may implement method 651. The recipient agent 512 may be member of the second team G2. Optionally, the recipient agent 512 may or may not be a brachiating agent 502 before or after performing the aspects of method 651.

Method 651 may include, in 601, updating (e.g., training or modifying), by the recipient agent 512, a task performing model 512m of the recipient agent 512 based on a knowledge transfer message 511 from a network device. Analogously to method 551, examples of the network device include: a first autonomous machine 150 (e.g., brachiating agent 502), a network device implementing the knowledge processing chain of the second team G2 and/or one or more stationary servers being in communication with the second team G2. According to various aspects, the one or more stationary servers may be configured to store, process and/or aggregate the knowledge from the brachiating agent 502, and, if desired, provide the result thereof (e.g., the extracted knowledge) to one or more second autonomous machines 150. The recipient agent 512 may be configured to obtain 605, e.g., receive 605, the knowledge transfer message 511.

Method 651 may include, in 603, generating, by the recipient agent 512, a message 513 (herein also referred to as control message 513) including at least one control instruction to perform at least one task of the second mission. The recipient agent 512 may generate the control message 513 in accordance with an in-machine communication protocol (in this case also referred to as in-machine control message 513) and/or may address the control message 513 to one or more actuators of the recipient agent 512. Examples of the one or more actuators of the recipient agent 512 may include: one or more actuators configured to move the recipient agent 512, one or more actuators configured to actuate a tool of the recipient agent 512, one or more actuators configured to move the tool (also referred to as effector) of the recipient agent 512, one or more actuators being part of the kinetic chain (e.g., a robotic arm) of the recipient agent 512.

Illustratively, the recipient agent 512 may utilize external knowledge, e.g., determined by another autonomous machine and/or based on the result of performing one or more first tasks, to advance its own task performing model 512*m*.

Figure 7:
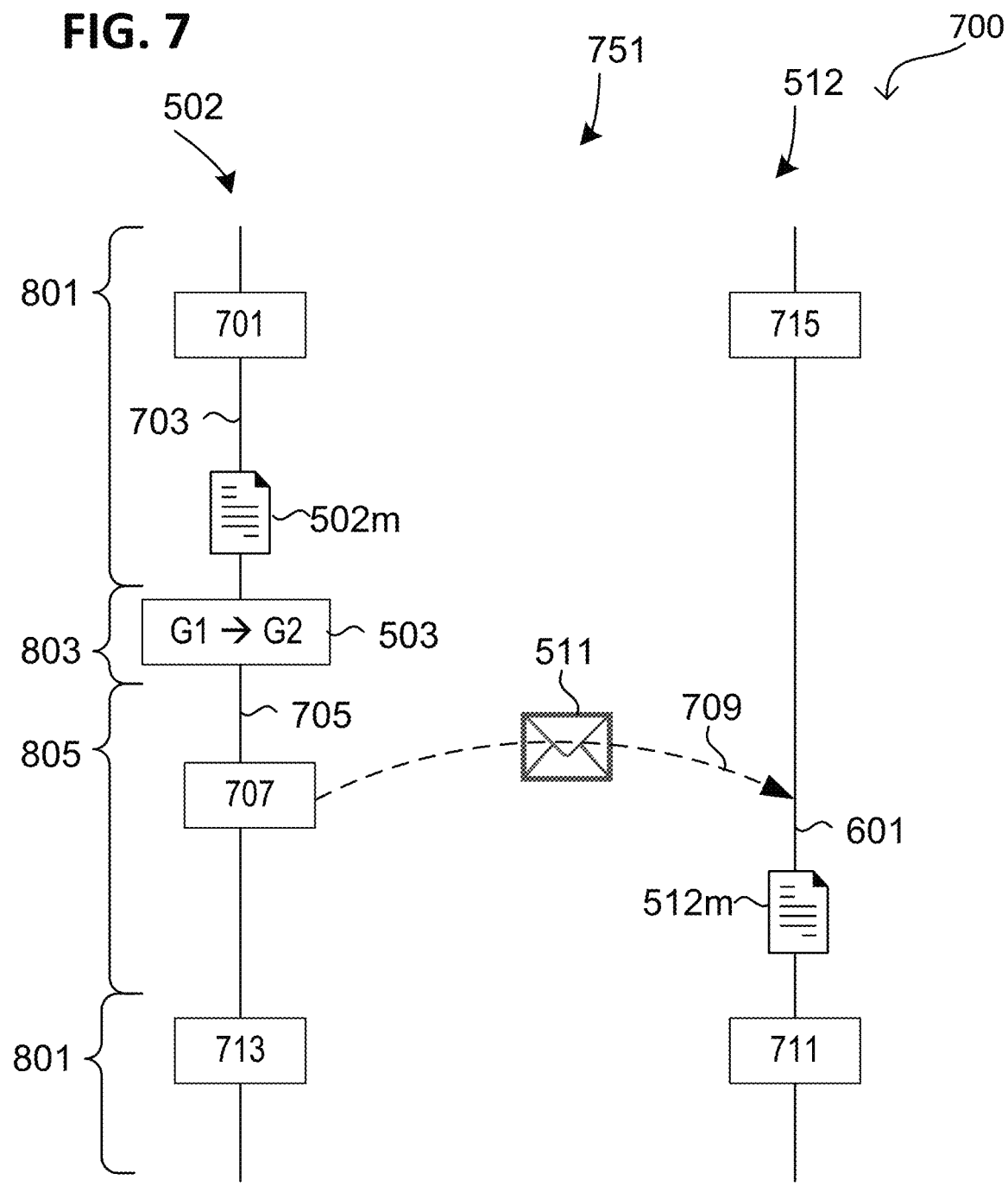
FIG. 7 shows a method in accordance with various aspects of the present disclosure in a schematic diagram.

FIG. 7 shows a method 751 in accordance with various aspects 700 of the present disclosure, in a schematic diagram, which may be configured in accordance one or more of aspects 100 to 600. One or more autonomous machines 150, namely a first autonomous machine 502 (e.g., brachiating agent 502) and a second autonomous machine 512 (e.g., recipient agent 512) may implement method 751.

Method 751 may include, in 701, contributing performing, by the first autonomous machine 502, the first mission (herein also referred to as first task performance 701). The first task performance 701 may include processing, by the first autonomous machine 502, one or more workpieces, e.g., by adding material to the workpiece, removing material from the workpiece, transforming the workpiece and the like. The first autonomous machine 502 may be configured to perform the first mission based on a first task performance model 502*m* of the first autonomous machine 502, e.g., by generating one or more in-machine control messages 513 based on the first task performance model 502*m*. The first autonomous machine may store the first task performance model 502*m*. A controller of the first autonomous machine 502 may implement the first task performing model 502.

Method 751 may include, in 703, updating (e.g., training or modifying) the task performing model 502 of the first autonomous machine 502 based on a result of performing the first mission (herein also referred to as task performance result). For example, the first autonomous machine 502 may be configured to sense, by the one or more sensors 104*s* of the first autonomous machine 502, the task performance result. For example, the result of sensing may be an input for training the first task performing model 502. Training the first task performing model 502 may include a reinforcement training. The first autonomous machine 502 may be affiliated to the first team G1 assigned to the first mission before, during and/or after updating 703 the first task performing model 502. The second autonomous machine 512 may be affiliated to a second team G2 before, during and/or after updating 703 the first task performing model 502.

Method 751 may include, in 503, the group migration of the first autonomous machine 502. The group migration 503 may include switching the affiliation of the first autonomous machine 502 from the first team G1 to the second team G2. The group migration 503 may include obtaining, by the first autonomous machine 502 and/or via a message, mission data of the second mission. For example, the second autonomous machine 512 and/or the central mission controlling authority of the second mission may provide the mission data to every autonomous machine joining the second team G2.

Method 751 may include, in 705, determining the knowledge 707 based on (e.g., extract from) the task performing model 502*m* (herein also referred to as knowledge source). As example, the type and/or content of the knowledge 707 may be a function of a grade of deviation of the first and second missions from each other (herein also referred to as mission deviation). The first autonomous machine 502 may be configured to determine the mission deviation, e.g., by a mission deviation determination model. For example, the mission deviation determination model may include a classification model (herein also referred to as classifier) or any other algorithm, e.g., using a parameterized formulation of the data of the first and second mission as input. The first autonomous machine 502 may implement the mission deviation determination model by any kind of neural network as outlined in more detail later.

Method 751 may include, in 709, transfer the knowledge (herein also referred to as knowledge transfer 709) via one or more knowledge transfer messages 511 from the first autonomous machine 502 to one or more second autonomous machines 512. As detailed above, the knowledge transfer 709 may be a direct knowledge transfer 709, e.g., without any further components of the knowledge processing chain between the first autonomous machine 502 and the second autonomous machine 512. In other aspects, the knowledge transfer 709 may be an indirect knowledge transfer 709, e.g., via one or more components of the knowledge processing chain between the first autonomous machine 502 and the second autonomous machine 512. Examples of the one or more one or more components of the knowledge processing chain may include: one or more servers, one or more network nodes (e.g., transceivers, etc.), one or more further autonomous machines 150, and the like.

The first autonomous machine 502 may be affiliated to the first team G1 before the knowledge transfer 709 and may be affiliated to the second team G2 assigned during and/or after the knowledge transfer 709. The second autonomous machine 512 may be affiliated to a second team G2 before, during and/or after the knowledge transfer 709.

Method 751 may include, in 601, updating (e.g., training or modifying), by the second autonomous machine 512, the task performing model 512*m* of the second autonomous machine 512 (herein also referred to as second task performing model 512) based on the knowledge 707.

Method 751 may include, in 711, performing, by the second autonomous machine 512, the second mission (herein also referred to as second task performance 711) after the update of the second task performing model 512*m* and/or in collaboration with the first autonomous machine 502. The second task performance 711 may include processing, by the second autonomous machine 512, one or more workpieces, e.g., by adding material to the workpiece, removing material from the workpiece, transforming the workpiece and the like. The second autonomous machine 512 may be configured to perform 711 the second mission based on the updated second task performance model 512*m*, e.g., by generating one or more in-machine control messages 513 based on the updated second task performance model 512*m*.

Method 751 may optionally include, in 713, performing, by the first autonomous machine 502, the second mission (herein also referred to as third task performance 713) after the knowledge transfer 707 and/or in collaboration with the second autonomous machine 512. The third task performance 713 may include processing, by the first autonomous machine 502, one or more workpieces, e.g., by adding material to the workpiece, removing material from the workpiece, transforming the workpiece and the like. The first autonomous machine 502 may be configured to perform the second mission based on the first task performance model 502m, e.g., by generating one or more in-machine control messages 513 based on the first task performance model 502m.

Method 751 may optionally include, in 715, performing, by the second autonomous machine 512, the second mission (herein also referred to as fourth task performance 715) before the update of the second task performing model 512m and/or without the first autonomous machine 502. The fourth task performance 715 may include processing, by the second autonomous machine 512, one or more workpieces, e.g., by adding material to the workpiece, removing material from the workpiece, transforming the workpiece and the like. The second autonomous machine 512 may be configured to perform the second mission based on the second task performance model 512m before updating the second task performance model 512m, e.g., by generating one or more in-machine control messages 513 based on the second task performance model 512m. For example, the second task performance 711 may be a continuation of the fourth task performance 715.

An exemplary implementation is detailed in the following. In a group of autonomous robots operating collaboratively, a single robot or each of a set of robots may be identified as brachiating robot 502. The brachiating robot(s) 502 may migrate 503 (illustratively, hop) to another group. Group migration 503 may include (e.g., only) a physical change, e.g., in case of a mobile robot displacing itself from one group to another and starting or joining the activity in the other group in terms of task distribution and/or transferring knowledge 709, etc. Group migration 503 may include (e.g., only) a logical change (e.g., based on IDs and/or keys), e.g., when the brachiating robot(s) are immobile (e.g., being stationary) and/no physical displacement of the robot is required. The brachiating robot(s) may identify themselves as members of the other group, where the task is about to begin or being in progress.

A variable time/duration (for instance, based on percentage task completion) may limit one or more autonomous machines considered as brachiating robot(s) to operate in a support phase 801. Most of the task execution happens in the support phase 801. Once selected as brachiating robot 502, the robot may execute a switching phase 803, when the robot is ready to migrate. When the brachiating robot 502 migrates to another group, a settle phase 805 is executed to integrate the brachiating robot 502 into the other group. In case, the brachiating robot(s) do not migrate in time, care may be taken that the task in the other group does not get stuck/jeopardized; but it might not be efficient (from compute or time to complete). The brachiating robot(s) may initiate or update one or more of: task distribution, compute distribution and data distribution based on their role and as they become part of the other group. The group communication protocol may be updated to connect the brachiating robot(s) to the other group. Once a mission or the respective task has been accomplished (herein also referred to as completed) or has reached a certain stage of completion, the brachiating robot(s) for that group may be re-assessed and identifications (IDs) may be updated to continue the overall process. Brachiating robot(s) from one group may join different groups, if required, e.g., depending on the application or scenario to advance and expedite one or more of learning, compute and task distribution.

An example scenario may include a federated learning set up, in which a subset of robots (depending on their connectivity to the server, capability, storage etc.) may be selected as brachiating robot for transferring the knowledge to other groups or to update the knowledge to the one or more servers. This concept may be extended to the scenario of mobile robots, in which the brachiation selection may be based further on the connectivity of the robot, e.g., to the target team; and/or the connectivity within the source team.

Figure 8:
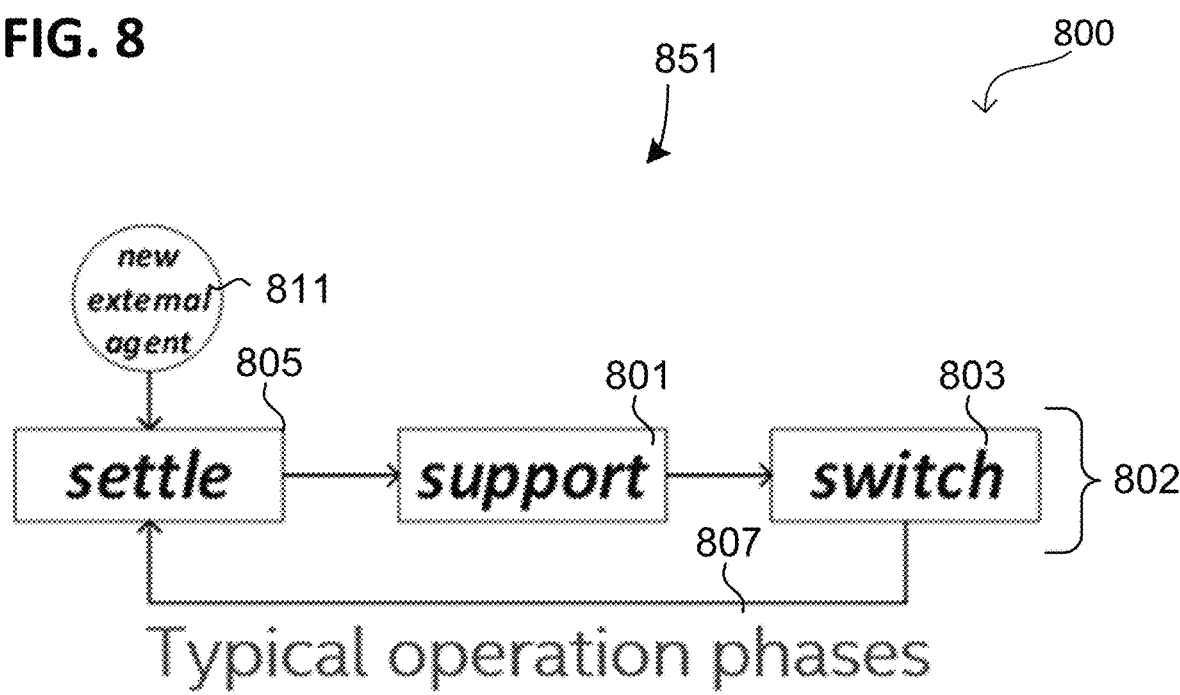
FIG. 8 shows an operation scheme in accordance with various aspects of the present disclosure in a schematic flow diagram.

FIG. 8 shows an operation scheme 851 in accordance with various aspects 800 of the present disclosure, in a schematic communication diagram, which may be configured in accordance one or more of aspects 100 to 700. One or more autonomous machines 150 may implement operation scheme 851. The operation scheme 851 may include a sequence 802 of multiple phases. The sequence 802 may include a first phase 801 (herein also referred to as support phase 801), a second phase 803 (herein also referred to as switching phase 803) and a third phase 805 (herein also referred to as settle phase 805).

Each of the one or more autonomous machine 150 may operate according to the operation scheme 851. The sequence 802 may be started (performing a first sequence 802), e.g., by initiating the settle phase 805, when the autonomous machine joins 811 a team. Alternatively, the sequence 802 may be started (performing the first sequence 802), e.g., by initiating the switching phase 805, when a group switching criterion is fulfilled.

As illustrated, the operation scheme 851 may include, optionally, to repeat 807 the sequence 802, e.g., N-times. N may be 2 or more, e.g., 5 or more, e.g., 10 or more, e.g., 20 or more, e.g., 50 or more, e.g., 100 or more. In the following, reference will be made to the n-th performance of the sequence 802 (herein also referred to as n-th sequence 802), wherein $1 \leq n \leq N+1$, for demonstrative purposes, and is not intended to be limiting. The references made to the n-th sequence 802 may analogously apply to any other sequence 802 of the operation scheme 851 and/or to any other method as detailed herein.

In the support phase 801 of the n-th sequence 802 (herein also referred to as n-th support phase 801), the one or more autonomous machines 150 are affiliated to the n-th team and may perform the n-th mission. Most of the task performance (e.g., task execution) happens in the support phase 801. A brachiating agent 502 may operate as "normal" member of the n-th team and may contribute to perform the mission of the n-th team (herein also referred to as n-th mission). In the support phase 801, the brachiating agent 502 may store the (e.g., state and/or action) pair with rewards to generate (e.g., build) a policy, which can be used as knowledge to be transferred.

When a network device (e.g., the brachiating agent 502) determines that a group switching criterion is fulfilled, the switching phase 803 of the n-th sequence 802 (herein also referred to as n-th switching phase 803) is initiated. Examples of the network device include: an autonomous machine 150 of the n-th team (e.g., the brachiating agent 502), a network device implementing the knowledge processing chain of the n-th team, and/or one or more stationary servers communicating with the n-th team. For example, the one or more stationary servers may implement a central mission controlling authority for one or more missions. The switching phase 803 may include the group migration 503, e.g., having the duration of the group migration 503. The group migration 503 may include that the brachiating agent 502 leaves the n-th team and/or joins the (n+1)-th team. The group migration 503 may include to inform the members of the n-th team, the mission authority and/or the members of the (n+1)-th team, that the brachiating agent 502 migrates.

In case, the brachiating agent 502 is in the n-th support phase 801, when the group switching criterion is fulfilled, the n-th support phase 801 may be ended (e.g., terminated). When the group switching criterion is not fulfilled, the brachiating agent 502 may maintain operating in the support phase 801. In a first example, the group switching criterion is fulfilled, when a time (e.g., duration), e.g., being variable and/or being a function of a grade (e.g., percentage) of task completion, reaches or passes a stored threshold. In a second example, the group switching criterion is fulfilled, when a grade (e.g., percentage) of task completion reaches or passes a stored threshold. Other examples of group switching criterion are detailed in the following.

The group switching criterion may be fulfilled, when the brachiating agent 502 determines a need to transfer the knowledge to one or more further groups. There might be a small time required (e.g., the time required to execute the switching phase), which the brachiating agent 502 may use to intimate the team it is working in, so that any dependency can be addressed. This may useful, when each of the one or more autonomous machines 105 is operating in autonomous operation mode without human intervention.

When the group migration 503 is completed, the brachiating agent 502 initiates a group integration by switching into the settle phase 805. The group integration may include to obtain, by the brachiating agent 502, the mission data of the (n+1)-th mission or to obtain one or more further processes to integrate the brachiating agent 502 into the (n+1)-th team. The group integration may include that the members of the (n+1)-th team broadcast one or more identifiers (herein also referred to as IDs) and/or other information as required to the brachiating agent 502 as new member of the (n+1)-team.

According to various aspects, the group integration may include to update the group communication protocol of the brachiating agent 502, e.g., based on a group ID of the (n+1)-th team and/or based on a machine ID (e.g., a mac address, serial number, or the like) of the members of the (n+1)-th team. The group integration may include to communicate the machine ID (e.g., a mac address, serial number, or the like) of the brachiating agent 502 to the members of the (n+1)-th team.

The settle phase 805 may further include the knowledge transfer 709, as detailed herein.

The sequence 802 may be stopped after the settle phase 805 (e.g., after the N-th settle phase 805), e.g., such that the brachiating agent 502 loses its brachiating identity. It may be understood that one or more members of a team and/or the mission authority may implement the operation scheme 851, e.g., by a respective protocol, to determine an autonomous machine as brachiating agent 502 (herein also referred to as identifying a brachiating agent 502 and/or brachiation selection). The sequence 802 may be started, e.g., by initiating the switching phase 805 for the selected autonomous machine, such that it obtains the brachiating identity, when the group switching criterion is fulfilled.

Other examples of events (illustratively, migration triggers), under which the group switching criterion is fulfilled, include: an instruction, e.g., from the mission authority and/or a human user, to initiate the group migration; when a duration without a group migration reaches or passes a stored threshold (e.g., to ensure a minimum rate of knowledge transfers); when a grade of completion of the one or more first tasks reaches or passes a stored threshold (e.g., to ensure a minimum rate of knowledge transfers); when an estimated gain obtained by a knowledge transfer 709 fulfils a stored gain criterion.

Other examples of group switching criterions include an operational criterion for an operational condition of the brachiating agent 502 and a quality criterion for a result of performing the n-th mission by the brachiating agent 502, which are detailed later.

Figure 9:
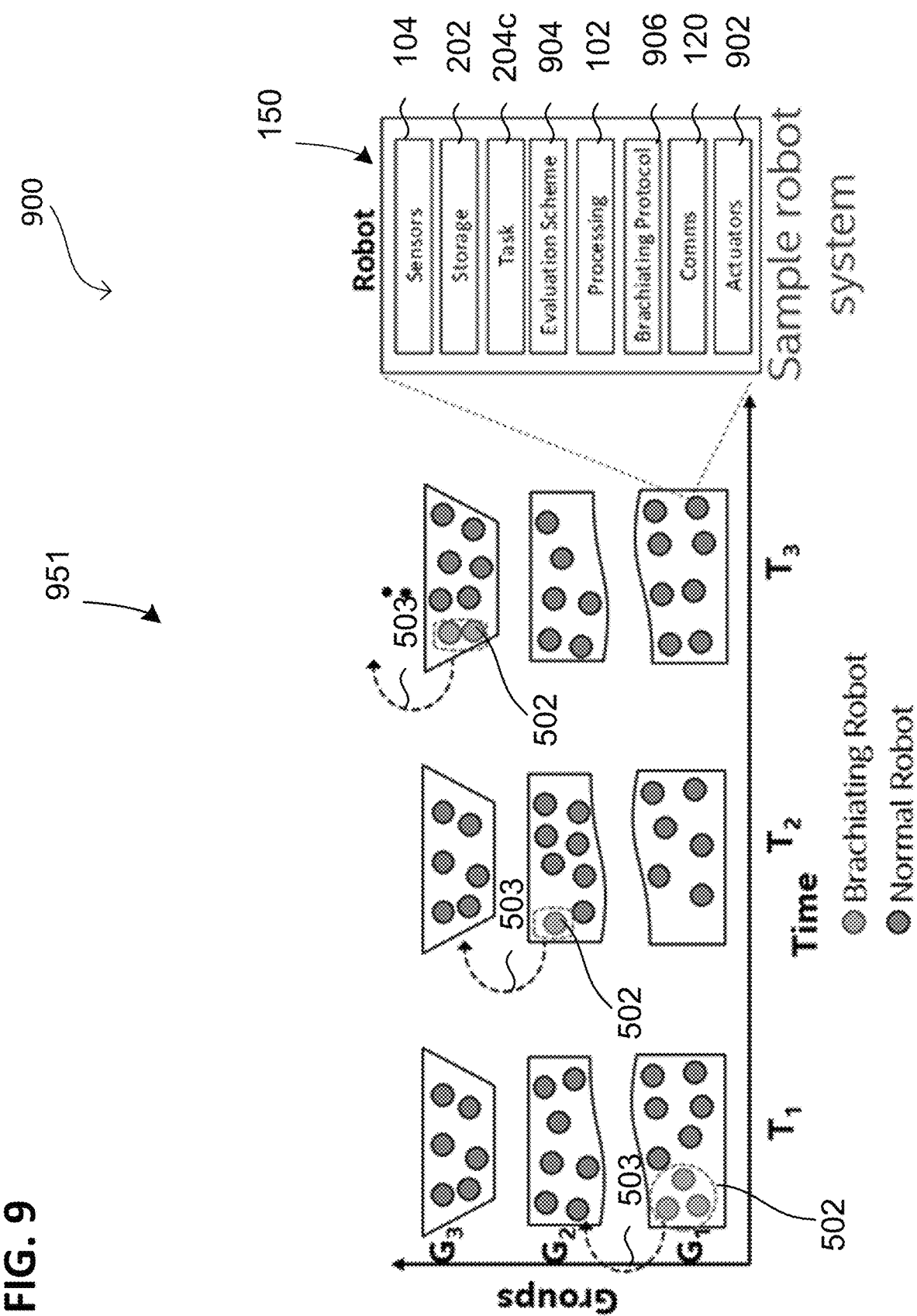
FIG. 9 shows a method in accordance with various aspects of the present disclosure, in a schematic diagram.
Figure 10A:
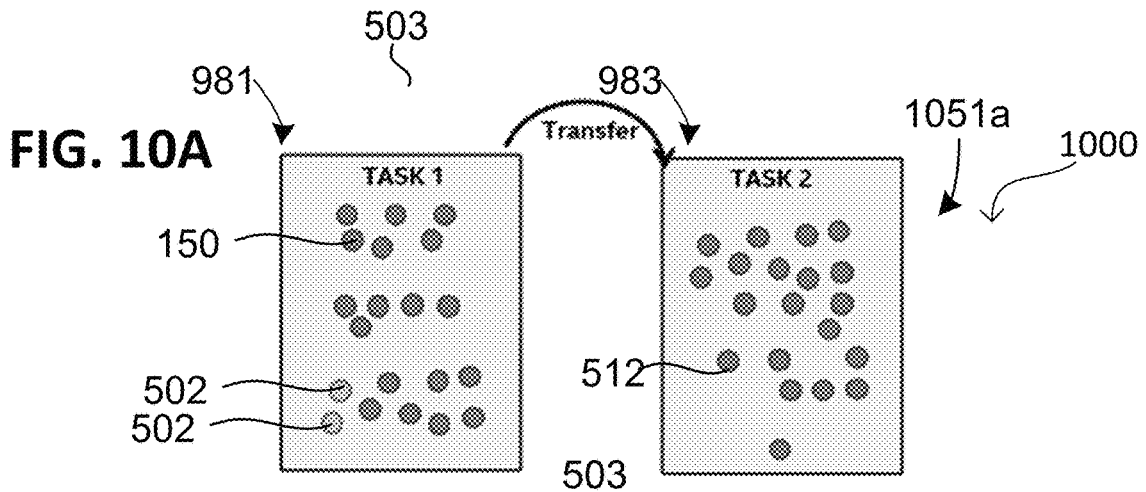
FIGS. 10A to D shows a method in accordance with various aspects of the present disclosure, in a schematic diagram.
Figure 10B:
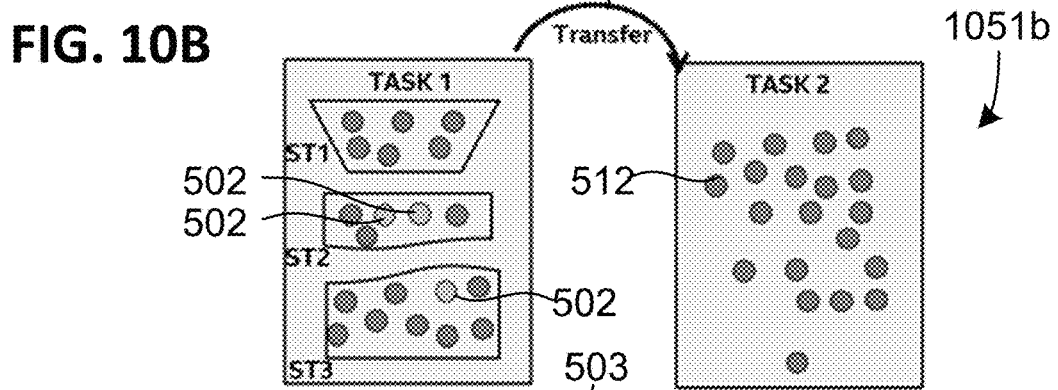
Figure 10C:
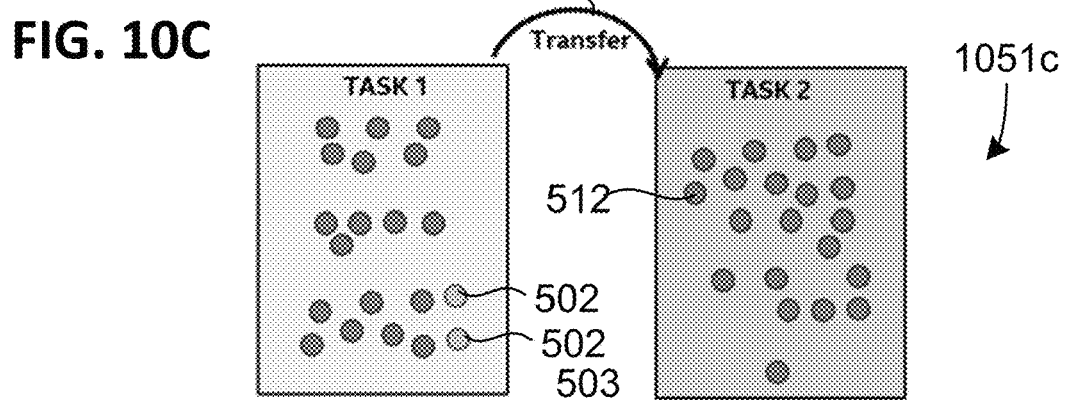
Figure 10D:
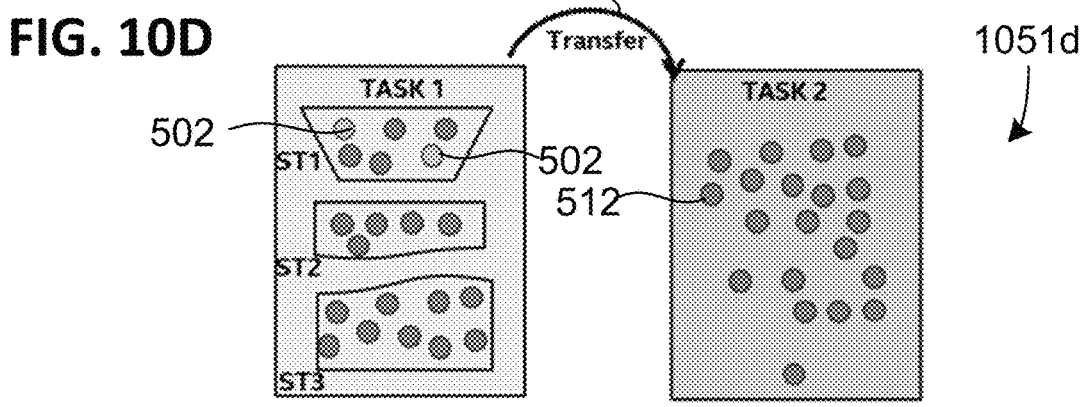

FIG. 9 shows a method 951 in accordance with various aspects 900 of the present disclosure, in a schematic diagram, which may be configured in accordance one or more of aspects 100 to 800. A plurality of autonomous machines 150, namely one or more autonomous machines 150 of a first team G1, one or more autonomous machines 150 of a second team G2 and one or more autonomous machines 150 of a third team G3, may implement method 951.

Each autonomous machine 150 may be configured to as detailed above, e.g., including one or more sensors 104s, one or more memories 202, the task performance model 204 (e.g., the task performing model 502m or the task performing model 512m), one or more components 904 of the knowledge processing chain, one or more processors 102, one or more protocols 906 implementing the operation scheme 951, one or more communication devices 120, and one or more actuators 902.

Examples of one or more protocols 906 (herein also referred to as brachiating protocols) include a protocol implementing a schema for determining (e.g., identifying) one or more brachiating agents 502 in a team; a protocol for enabling the distributed sharing (of knowledge, information and/or resources) and learning; and/or one or more protocols for identification and activation of settle, support and switching phases. When one or more brachiating agents 502 advance to other groups or advance in tasks, a mechanism to preserve/drop their brachiating identity may be part of the one or more protocols 906.

In the illustrated example, $T_1$ corresponds to $n=n_1$, e.g., $n_1$ being 1; $T_2$ corresponds to $n=n_2>n_1$, e.g., $n_2$ being 2; and $T_3$ corresponds to $n=n_3>n_2$, e.g., $n_3$ being 3. The method 951 includes, at $T_1$, determining three autonomous machines of G1 as brachiating agents 502 to migrate 503 to G2; at $T_2$, determining one autonomous machine of G2 as brachiating agent 502 to migrate 503 to G3; and at $T_3$, determining two autonomous machines of G3 as brachiating agents 502 to migrate 503 to a further team.

Further examples of one or more protocols 906 include a protocol to determine the actual scenario for the knowledge transfer (herein also referred to as scenario protocol). For example, the mission deviation determinator may implement the scenario protocol. The scenario protocol may be configured to identify different scenarios and provide the procedure for the brachiating protocol to perform the knowledge transfer 709 between multiple autonomous agents. The brachiating policy (and which autonomous machine is selected to brachiate) for the autonomous machines 150 may be a function of the determined scenario. The scenario protocol may include an adaptive policy scheme that could be useful in the multiple scenarios.

In a facilitated scenario, homogeneous autonomous machines 150 operate together to accomplish a mission. For example, autonomous machines 150 of same type or at least similar type may operate together to accomplish a welding process and/or a screw-insertion process. There could be multiple groups of homogeneous autonomous machines working collaboratively. In this scenario, the knowledge transfer 709 is most effective.

A more complex scenario may include heterogeneous machines and different applications. For instance, a first team may include autonomous ground robots and aerial drones, which together accomplishing a mission (e.g., a package delivery). In such a scenario, a brachiating agent 502 may advance the mission (e.g., helping to quickly jumpstart the mission) with knowledge 'learnt' while operating under another team. The brachiating agent 502 may provide a significant improvement by connecting these teams via the knowledge transfer 709 (herein also referred to as sharing knowledge). This knowledge transfer 709 may be understood to also include a partial knowledge transfer 709. In such a more complex scenario, the brachiation selection (e.g., identifying the brachiating agent) and choosing the knowledge to be transferred (e.g., shared) becomes an optimization parameter.

The mission deviation determinator may be configured to distinguish between different scenarios, e.g., for the brachiating protocol, to perform the knowledge transfer 709, which may result in an effective task/mission accomplishment. Some exemplary scenarios, which are distinguished, are detailed below.

FIG. 10 shows a various scenarios 1051*a* to 1051*d* of method 551 in accordance with various aspects 1000 of the present disclosure, in a schematic diagram, which may be configured in accordance one or more of aspects 100 to 900. One or more autonomous machines 150, namely one or more first autonomous machines 502 (e.g., brachiating agents 502) and one or more second autonomous machines 512 (e.g., recipient agents 512) may implement method 1051.

Herein, reference is made to a classifier as exemplary mission deviation determination model, for demonstrative purposes, and is not intended to be limiting. The references made to the classifier, may analogously apply to any other implementation of the mission deviation determinator as detailed herein. Generally, the output of the classifier may represent, whether the mission deviation is below or above a certain threshold, or is in the range between two thresholds.

According to various aspects, the classifier may be configured to classify the similarity of two or more missions including the source mission 981 and one or more target missions 983. Exemplary results of the classification may represent that the two or more missions are similar (e.g., determined as first class) or not similar (e.g., determined as second class). It may be understood that the classifier may implement any number of classes to classify the similarity of the two or more missions, e.g., more than two classes. For example, the classifier may include a various number if interim classes between the first class and the second class, which are herein represented by a third class representing a moderate similarity of the two or more missions.

Illustratively, scenario 1051*a* represents the case of similar tasks and similar domains; scenario 1051*b* represents the case of different tasks and similar domains; scenario 1051*c* represents the case of similar tasks and different domains; and scenario 1051*d* represents the case of different tasks and different domains. For each of these scenarios, the brachiating protocol may implement an individual constraint (such as, policy transfer, instance transfer, parameter transfer, etc.) to optimize the knowledge transfer 709. An operator or a member of the target team may provide the mission data of the target mission (e.g., including content information and/or domain information) to the members of the source team. The brachiation selection may be based on the mission data of the target mission, e.g., on the content information and/or the domain information. This enables that the result of the brachiation selection, e.g., the respective brachiating agent(s) 502, may be a function of the target mission, e.g., the mission content and/or the mission domain, e.g., beside the capability and functionality of the autonomous machine 150.

Examples of the knowledge transfer may include, in case of a similar domain and a similar content (e.g., task objects), an instance transfer; in case of different domains and similar contents (e.g., task objects), a policy transfer; and in case of similar domains and different contents (e.g., task objects), a parameter transfer.

According to various aspects, the classifier may be configured to classify the two or more missions based on their deviation from each other (herein also referred to as mission deviation), e.g., based on a location and/or task subject deviation. The spatial mission deviation may represent the distance between the location of the target mission 983 (herein also referred to as target domain) and the location of the source mission (herein also referred to as source domain). A location of a mission (herein also referred to as domain) may indicate, where the one or more tasks of the mission are to be performed, e.g., indicating one or more of the following: where the workpiece to be processed is located, a location on the workpiece (where the workpiece has to be processed), where the autonomous machine is located to process the workpiece. The task subject mission deviation may represent the difference between the content of the target mission 983 (e.g., its object, e.g., objective) and the content of the source mission 981 (e.g., its object, e.g., objective). A content of a mission/task (herein also referred to as mission object or task object) may indicate, what the mission/task is about (e.g., the object of the mission/task), e.g., may indicate one or more of the following: the desired result of processing the workpiece, any number of actions to process the workpiece, the type of processes for processing the workpiece (e.g., welding, displacing, heating, cutting, etc.).

For example, the knowledge 707 may include or be formed from an instance of the first task performing model 502*m*, when the classifier determines that the target mission 983 and the source mission 981 are similar. For example, the classifier may determine that the target mission 983 and the source mission 981 are similar, when both of their spatial and task subject mission deviations are minimal, e.g., being both deviations are less than a predefined/stored threshold, e.g., a threshold that the first autonomous machine 502 stores.

For example, the knowledge 707 may include or be formed from a task performing policy, when the classifier determines that the target mission 983 and the source mission 981 are moderate similar. The first task performing model 502*m* may implement the task performing policy. The classifier may determine that the target mission 983 and the source mission 981 are moderate similar, when one of their spatial and task subject mission deviations is minimal, e.g., being less than the stored threshold, and the other of one of their spatial and/or task subject mission deviations is maximal, e.g., being above the stored threshold.

For example, the knowledge 707 may include or be formed from a model parameter set, when the classifier determines that the target mission 983 and the source mission 981 are not similar. The first task performing model 502*m* may implement the model parameter set. The classifier may determine that the target mission 983 and the source mission 981 are not similar, when the spatial and task subject mission deviations are maximal, e.g., being both above the stored threshold.

Figure 11:
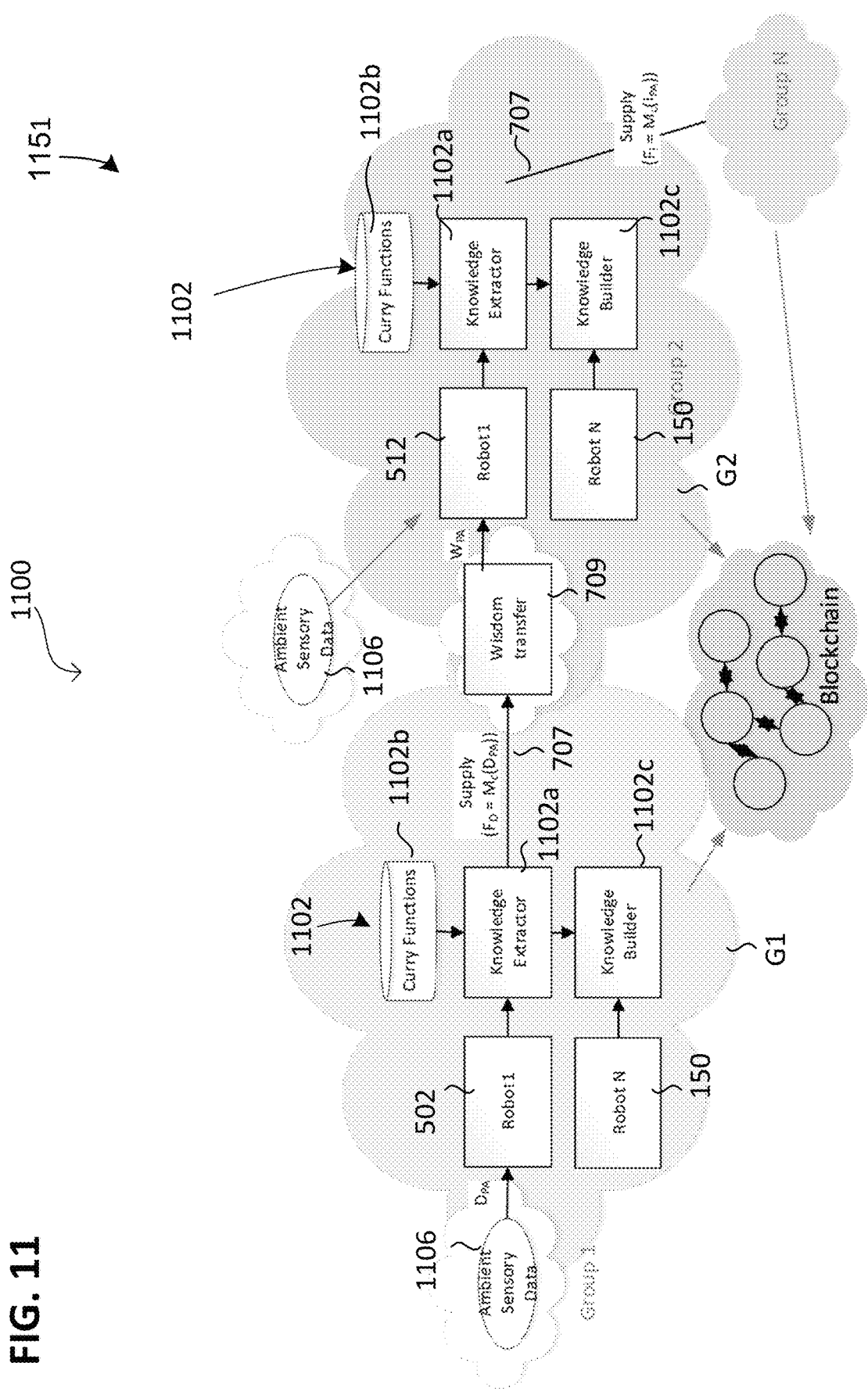
FIG. 11 shows a system in accordance with various aspects of the present disclosure, in a schematic diagram.

FIG. 11 shows a system 1151 in accordance with various aspects 1100 of the present disclosure, in a schematic communication diagram, which may be configured in accordance one or more of aspects 100 to 1000. The system 1151 may include a source team (e.g., G1) including the brachiating agent 502 and optionally one or more autonomous machines 150. The system 1151 may include a target team (e.g., G2) including the recipient agent 512 and optionally one or more autonomous machines 150.

The brachiation selection may be based on one or more switching criterions, for which exemplary implementations are detailed below.

In a first implementation, a quality criterion may be used as switching criterion. The quality criterion may be fulfilled, when a deviation of the result of performing the source mission from a predefined result (herein also referred to as reference result) reaches or passes a stored threshold. For each task performance, an autonomous machine 150 may store an expected outcome (herein also referred to as reference result of the task performance) and a configuration (herein also referred to as operational condition of the autonomous machine 150). For example, a welding process is expected to follow a configuration and to produce no error. When the operational condition used produces one or more errors or deviate considerably from a reference configuration, a brachiation parameter (illustratively, representing the possibility/probability of brachiation) may be incremented. When the brachiation parameter reaches or passes the stored threshold, the autonomous machine 105 may be determined as brachiating agent 502.

In a second implementation, a gain criterion may be used as switching criterion. The gain criterion may be fulfilled, when an advance (e.g., acceleration) of completing the target mission by the help of the brachiating agent 502 reaches or passes a stored threshold; when the source team is capable of completing the source mission without the brachiating agent 502; and/or when the task performance model of the target group would be advanced by the knowledge transfer. When an autonomous machine 150 performing one or more tasks of a mission completes the one or more tasks, the autonomous machine 150 determines the brachiation parameter (e.g., representing a final probability to brachiate) based on an answer to one or more (e.g., a balance of) the following questions Q1 to Q3:

(Q1) Can the rest of the robots cover its tasks even if it takes them longer to do so?

(Q2) Can it increase its learning by modifying the configuration and testing the new configuration in the next cell?

(Q3) Will its contribution in the next cell help accomplish the task quicker? When the brachiation parameter reaches or passes the stored threshold, the autonomous machine 105 may be determined as brachiating agent 502 or the autonomous machine 150 may determine itself as brachiating agent 502 (illustratively, decides to brachiate), e.g., by initiating the switching phase 805. The brachiation parameter may reach or pass the stored threshold, when the gain regarding Q3 offsets the loss in Q1 or comes close to offsetting, and the probability of learning in Q2 is greater than a certain threshold.

In the following, an exemplary implementation of the knowledge processing chain 1102 is detailed. The knowledge processing chain 1102 may include currying to bind an input to a knowledge margin function to abstract any group sensitive privacy data or to filter noise vs. good signal. An immersive experience (IEXP) may be associated with sensed data (d1, dn), e.g. navigation context, IVI context, passenger's context, etc., and with a sensitivity level L=(l1, ..., ln), such that a first sensitivity level l1 (e.g. "unclassified") indicates data at sensitivity level l1 and a second sensitivity level l2 (e.g. "sensitive") indicates data at sensitivity level l2. Optionally, further classifications may implement sensitivity levels l3 and l4, which may be respectively at higher classification levels than l2.

The immersive experience may include a distribution of applications a in A={a1, a2, ... an} that classifies data in (d1 ... dn) with sensitivity levels L, such that a(DL)={(d1,l1), (d2,l2), ... (dn,ln)}, wherein a1→(D1L1) is a first datum having a first sensitivity level and a second sensitivity level exists for a second datum at application a2 such that a2→(d2l2).

The immersive experience transaction IEXP may be formulated as IEXP=F (KNOWLEDGE_MAPPER (D, R, W), Tx, A, QoS, M).

The expected Quality-Of-Service (QoS) may include parametrized costs (e.g., attributes, performance, transaction clearing cost, etc.). M represents the machine learning feedback to be incorporated for a next iteration of scheduling calculations. F denotes a scheduling function F.

The KNOWLEDGE_MAPPER( ) is a function that computes a trust score or probability of mapping the knowledge learnt with an immersive experience. D represents the distributed ingredients required for the immersive experience application A. W represents the set of applications in A that complies with whitelist configuration known to be trustworthy. For example, the system may publish the whitelist on a public blockchain. In case of security operations require an attestation, the system may perform a whitelist check, AV scanning, firewall scan, etc. R represents the risk that is at stake; for example, the value or opportunity of costs resulting from performing the transaction Tx.

Said more generally, the knowledge processing chain 1102 may be configured to determine the functioning of the task performing model of the brachiating agent 502 as knowledge (herein also referred to as knowledge extraction). The knowledge processing chain 1102 may include a knowledge extractor 1102a configured to perform the knowledge extraction. The knowledge extraction may include to convert the task performing model into one or more mathematical relations (e.g., including a knowledge margin function) representing the functioning of the task performing model. As example, the knowledge extractor 1102a may apply a curry function 1102b to the task performing model (herein also referred to as currying). Currying denotes various techniques of converting a functioning that takes multiple arguments into a sequence of functions, of which each takes a single argument.

Examples of a result of the knowledge extraction may include (e.g., only) a task performing policy; (e.g., only) a model parameter set based on the task performing model; and/or (e.g., only) an instance of the task performing model.

The knowledge processing chain 1102 may include a knowledge builder 1102c, e.g., being configured to aggregate the extracted knowledge of a team.

The autonomous machine 150, e.g., of the brachiating agent 502, may be configured to supply the sensing result 1106, e.g., the respective sensing data $D_{PA}$, to its task performing model, which outputs a control instruction $F_D$ or a representative $F_D$ thereof. The knowledge extraction may include to determine one or more mathematical relations $M_C$ (e.g., functions), which fulfill the following relation $F_D=M_C(D_{PA})$. The one or more mathematical relations $M_C$ behave like the task performing model (herein also referred to as emulation), such that they imitate the task performing model. The autonomous machine 150, e.g., the brachiating agent 502, may supply the result of the knowledge extraction, e.g., the one or more mathematical relations $M_C$, to the knowledge transfer 709.

The recipient agent 512 may update (e.g., train) its task performing model based on the knowledge transfer 709, e.g., based on the one or more mathematical relations $M_C$ (provided as data $W_{PA}$). The updated task performing model may output a control instruction $F_I$ or a representative thereof $F_I$. In the next iteration, the recipient agent 512 may be selected as brachiating agent 502 to migrate to another group GN. The knowledge extraction may include to determine one or more mathematical relations $M_C$ (e.g., functions), which fulfill the following relation $F_I=M_C(I_{PA})$, and supply the one or more mathematical relations $M_C$ to the next knowledge transfer 709.

In the following, a scenario with elevated security demand is addressed, for which a privacy preserved knowledge transfer 709 is provided. The scenario with elevated security considers the factor that, while brachiating and transferring knowledge, a certain grade of privacy may be requested. For example, when knowledge of autonomous machines 150 (e.g., robots/agents) operating in factory A is to be transferred to the autonomous machines operating in factory B, the task performing model may not be transferred directly due to probably privacy and/or security reasons. The knowledge processing chain 1102 may include a differential privacy mechanism, for instance, while the autonomous machines 502 are training and/or operating in factory A. The privacy mechanism may include to assign the autonomous machine to a privacy budged, which is to be met to qualify as candidate for brachiating and being the source of the knowledge transfer 709. As further example, the knowledge processing chain 1102 may include a blockchain as privacy mechanism.

In the following, various aspects of the present disclosure will be illustrated:

Example 1 is a method (e.g., a controller of an automated, e.g., autonomous, machine may perform the method of Example 1, e.g., being a controller of the brachiating agent), the method including: determine, e.g., by the controller and/or one or more processors thereof, that a group affiliation of the automated, e.g., autonomous, machine switched from a first group (e.g., of automated, e.g., autonomous, machines) to a second group (e.g. of automated, e.g., autonomous, machines), the first group (e.g. of automated, e.g., autonomous, machines) being assigned to one or more first tasks, the second group (e.g. of automated, e.g., autonomous, machines) being assigned to one or more second tasks; generate, e.g., by the controller and/or one or more processors thereof, a message for one or more network devices associated with (e.g., affiliated to, e.g., being a member of) the second group (e.g. of automated, e.g., autonomous, machines) in accordance with a (e.g., wireless and/or wired) communication protocol, the message including information about a task performing model of the automated, e.g., autonomous, machine, the task performing model being based (e.g., trained, e.g., reinforced trained) on a result of performing at least one task of the one or more first tasks by the automated, e.g., autonomous, machine.

Example 2 is the method according to example 1, including to determine, e.g., by the controller and/or one or more processors thereof, that the group affiliation of the automated, e.g., autonomous, machine switched, when (e.g., in response to) one or more of the following events have been determined, e.g., by the controller and/or one or more processors thereof: the automated, e.g., autonomous, machine displaces (e.g., the physical group migration) from a location of the one or more first tasks to a location of the one or more second tasks; and/or a stored group affiliation identifier of the automated, e.g., autonomous, machine is updated (e.g., the logical group migration); a group communication protocol of the automated, e.g., autonomous, machine is updated; the controller and/or the one or more processors thereof initiated switching the group affiliation of the automated, e.g., autonomous, machine from the first group (e.g. of automated, e.g., autonomous, machines) to the second group (e.g. of automated, e.g., autonomous, machines).

Example 3 is the method according to example 1 or 2, further including: to initiate, e.g., by the controller and/or one or more processors thereof, switching the group affiliation of the automated, e.g., autonomous, machine from the first group (e.g. of automated, e.g., autonomous, machines) to the second group (e.g. of automated, e.g., autonomous, machines), e.g., when (e.g., in response to) a group switching criterion is fulfilled.

Example 4 is the method according to example 3, wherein the group switching criterion is fulfilled, when one or more of the following events occur: obtaining (e.g. receiving), e.g., by the controller and/or one or more processors thereof, an (e.g., group external) instruction to switch the group affiliation; when determining, e.g., by the controller and/or one or more processors thereof, that a duration of the group affiliation being unchanged reaches or passes a stored threshold; when determining, e.g., by the controller and/or one or more processors thereof, that a grade of completion of the one or more first tasks reaches or passes a stored threshold; when determining, e.g., by the controller and/or one or more processors thereof, that an operational condition of the automated, e.g., autonomous, machine fulfils an operational criterion; when determining, e.g., by the controller and/or one or more processors thereof, that the result of performing the at least one task of the one or more first tasks by the automated, e.g., autonomous, machine fulfils a quality criterion; and/or when estimating, e.g., by the controller and/or one or more processors thereof, that a gain obtained by switching the group affiliation of the automated, e.g., autonomous, machine fulfils an gain criterion.

Example 5 is the method according to example 4, wherein the operational criterion is fulfilled when determining, e.g., by the controller and/or one or more processors thereof, that: a connectivity of the automated, e.g., autonomous, machine to a server (e.g., being in communicative connection with the first group and/or the second group) reaches or passes a stored threshold; a connectivity of the automated, e.g., autonomous, machine to the second group reaches or passes a stored threshold; a storage of the automated, e.g., autonomous, machine to a server reaches or passes a stored threshold; a task capability of the automated, e.g., autonomous, machine to a server reaches or passes a stored threshold.

Example 6 is the method according to example 4 or 5, wherein the quality criterion is fulfilled, when: determining, e.g., by the controller and/or one or more processors thereof, that a deviation of the result (of performing the at least one task) from a predefined (e.g., stored) result reaches or passes a stored threshold; and/or when determining, e.g., by the controller and/or one or more processors thereof, that the one or more first tasks are completed.

Example 7 is the method according to one of examples 4 to 6, wherein the gain criterion is fulfilled, when determining, e.g., by the controller and/or one or more processors thereof, that an advance (e.g., acceleration) of completing the one or more second tasks by the second group (e.g. of automated, e.g., autonomous, machines) including the automated, e.g., autonomous, machine reaches or passes a stored threshold; the first group (e.g. of automated, e.g., autonomous, machines) is capable of completing the one or more first tasks without the automated, e.g., autonomous, machine; training the task performance model based on a result of performing the one or more second tasks advances the task performance model more than training the task performance model based on a result of performing the one or more first tasks.

Example 8 is the method according to one of examples 1 to 7, wherein the one or more network devices include one or more further automated, e.g., autonomous, machines.

Example 9 is the method according to one of examples 1 to 8, wherein the one or more network devices include a stationary server, the server being configured to implement a task management for the one or more second tasks.

Example 10 is the method according to one of examples 1 to 9, further including: to generate, e.g., by the controller and/or one or more processors thereof, the message, when (e.g., in response to) determining that the group affiliation of the automated, e.g., autonomous, machine switched from the first group (e.g. of automated, e.g., autonomous, machines) to the second group (e.g. of automated, e.g., autonomous, machines), e.g., when the group switching criterion is fulfilled.

Example 11 is the method according to one of examples 1 to 10, wherein the message further includes a machine identifier of the automated, e.g., autonomous, machine.

Example 12 is the method according to one of examples 1 to 11, wherein the information (e.g., its content and/or type) is determined, e.g., by the controller and/or one or more processors thereof, as function of the deviation of the one or more first tasks from the one or more second tasks.

Example 13 is the method according to one of examples 1 to 12, wherein the message is addressed to one or more automated, e.g., autonomous, machines of the second group (e.g. of automated, e.g., autonomous, machines), e.g., to each automated, e.g., autonomous, machine of the second group (e.g. of automated, e.g., autonomous, machines).

Example 14 is the method according to one of examples 1 to 13, wherein the task performing model is a trained model, e.g., trained based on the result of performing the at least one task of the one or more first tasks by the automated, e.g., autonomous, machine and/or trained reinforcement based, e.g., reward based.

Example 15 is the method according to one of examples 1 to 14, wherein the information reflects a functioning of the task performing model, e.g., an operational functionality of the task performing model.

Example 16 is the method according to one of examples 1 to 15, wherein the information includes one or more mathematical relations, which are based on and/or which emulate the task performing model.

Example 17 is the method according to example 16, wherein the one or more mathematical relations map the task performing model.

Example 18 is the method according to one of examples 1 to 17, wherein the information includes a result of currying the task performing model.

Example 19 is the method according to one of examples 1 to 18, further including: to determine, e.g., by the controller and/or one or more processors thereof, the information about the task performing model, e.g., after the group affiliation of the automated, e.g., autonomous, machine switched from the first group (e.g. of automated, e.g., autonomous, machines) to the second group (e.g. of automated, e.g., autonomous, machines).

Example 20 is the method according to example 19, wherein determining the information includes converting the task performing model into one or more mathematical relations (e.g., including one or more knowledge margin functions), e.g., into a sequence of mathematical relations.

Example 21 is the method according to example 19 or 20, wherein determining the information includes currying the task performing model.

Example 22 is the method according to one of examples 1 to 21, wherein the information about the task performing model includes an instance of the task performing model, e.g., when a (e.g., spatial and/or task subject) deviation of the one or more first tasks from the one or more second tasks is less than a stored threshold.

Example 23 is the method according to one of examples 1 to 22, wherein the task performing model implements a policy (e.g., task performing policy), the information about the task performing model including the policy, e.g., when a spatial deviation of the one or more first tasks from the one or more second tasks reaches or passes a stored threshold, and/or when a task subject deviation of the one or more first tasks from the one or more second tasks is less than a stored threshold.

Example 24 is the method according to one of examples 1 to 23, wherein the task performing model implements a parameter set, the information about the task performing model including the parameter set, e.g., when a (e.g., spatial and/or task subject) deviation of the one or more first tasks from the one or more second tasks reaches or passes a stored threshold.

Example 25 is a controller (e.g. for the automated, e.g., autonomous, machine), including one or more processors configured to perform the method according to one of examples 1 to 24.

Example 26 is one or more non-transitory computer-readable media storing instructions thereon that, when executed by one or more processors, direct the one or more processors to perform the method according to one of examples 1 to 24.

Example 27 is an automated, e.g., autonomous, machine, e.g., the brachiating agent, including the controller according to example 25 and/or the one or more non-transitory computer-readable media according to example 26.

Example 28 is a method (e.g., a controller for an automated, e.g., autonomous, machine may perform the method of Example 28, e.g., for the recipient agent), the method including: to update (e.g., train or modify), e.g., by the controller and/or one or more processors thereof, a task performing model of the automated, e.g., autonomous, machine based on a message from a further automated, e.g., autonomous, machine, the message including information about a further task performing model of the further automated, e.g., autonomous, machine; generate, e.g., by the controller and/or one or more processors thereof, a (e.g., in-machine) control message based on the updated task performing model of the automated, e.g., autonomous, machine, the control message including at least one instruction for an actuator of the automated, e.g., autonomous, machine to perform one or more tasks.

Example 29 is the method according to example 28, wherein the information includes one or more mathematical relations, which are based on and/or emulate the task performing model, e.g., wherein the one or more mathematical relations map the task performing model.

Example 30 is the method according to example 28 or 29, wherein a group affiliation of the further automated, e.g., autonomous, machine switched from a first group (e.g. of automated, e.g., autonomous, machines) to a second group (e.g. of automated, e.g., autonomous, machines) (e.g., before the message is generated and/or obtained), the automated, e.g., autonomous, machine being affiliated to the second group (e.g. of automated, e.g., autonomous, machines) (e.g., when the further automated, e.g., autonomous, machine joined the group (e.g. of automated, e.g., autonomous, machines)).

Example 31 is the method according to one of examples 28 to 30, the further automated, e.g., autonomous, machine joined a (e.g., second) group (e.g. of automated, e.g., autonomous, machines) (e.g., before the message is generated and/or obtained), the automated, e.g., autonomous, machine being affiliated to the group (e.g. of automated, e.g., autonomous, machines) (e.g., when the further automated, e.g., autonomous, machine joined the group (e.g. of automated, e.g., autonomous, machines)).

Example 32 is the method according to one of examples 28 to 31, wherein the automated, e.g., autonomous, machine is affiliated to a (e.g., second) group (e.g. of automated, e.g., autonomous, machines) (e.g., when the message is generated and/or obtained), wherein the message is addressed to each automated, e.g., autonomous, machine of the group (e.g. of automated, e.g., autonomous, machines).

Example 33 is the method according to one of examples 28 to 32, wherein the message includes a machine identifier of the further automated, e.g., autonomous, machine.

Example 34 is the method according to one of examples 28 to 33, further including: to update, e.g., by the controller and/or one or more processors thereof, a group communication protocol of the automated, e.g., autonomous, machine to address the further automated, e.g., autonomous, machine, e.g., update a group communication protocol based on the machine identifier of the further automated, e.g., autonomous, machine.

Example 35 is the method according to one of examples 28 to 34, wherein the task performing model is a trained model, e.g., trained based on the result of performing at least one task by the further automated, e.g., autonomous, machine and/or trained reinforcement based, e.g., reward based.

Example 36 is the method according to one of examples 28 to 35, wherein the information reflects a functioning of the task performing model, e.g., an operational functionality of the task performing model.

Example 37 is the method according to one of examples 28 to 36, wherein the information includes one or more mathematical relations, which are based and/or emulate on the task performing model, e.g., wherein the one or more mathematical relations map the task performing model.

Example 38 is the method according to one of examples 28 to 37, wherein the information includes a result of currying the task performing model.

Example 39 is the method according to one of examples 28 to 38, wherein the information about the task performing model includes an instance of the task performing model, e.g., when a (e.g., spatial and/or task subject) deviation of the one or more tasks from the one or more further tasks is less than a stored threshold.

Example 40 is the method according to one of examples 28 to 39, wherein the task performing model implements a policy (e.g., task performing policy), the information about the task performing model including the policy, e.g., when a spatial deviation of the one or more tasks from the one or more further tasks reaches or passes a stored threshold, and/or when a task subject deviation of the one or more tasks from the one or more further tasks is less than a stored threshold.

Example 41 is the method according to one of examples 28 to 40, wherein the task performing model implements a parameter set, the information about the task performing model including the parameter set, e.g., when a (e.g., spatial and/or task subject) deviation of the one or more tasks from the one or more further tasks reaches or passes a stored threshold.

Example 42 is a controller (e.g. for the automated, e.g., autonomous, machine), including one or more processors configured to perform the method according to one of examples 28 to 41.

Example 43 is one or more non-transitory computer-readable media storing instructions thereon that, when executed by one or more processors, direct the one or more processors to perform the method according to one of examples 28 to 42.

Example 44 is an automated, e.g., autonomous, machine including the controller according to example 42 and/or the one or more non-transitory computer-readable media according to example 43.

Example 45 is a method (e.g., a controller for a network device may perform the method of Example 45, for an automated, e.g., autonomous, machine), the method including: to update (e.g., e.g., train or modify), e.g., by the controller and/or one or more processors thereof, a task performing model of the automated, e.g., autonomous, machine based on a result of performing a task by the automated, e.g., autonomous, machine; to generate, e.g., by the controller and/or one or more processors thereof, a message to one or more further automated, e.g., autonomous, machines in accordance with a (e.g., wireless and/or wired) communication protocol, the message including an information about the updated task performing model.

Example 46 is the method according to example 45, wherein the task performing model is a trained model, e.g., trained based on the result of performing at least one task by the further automated, e.g., autonomous, machine and/or trained reinforcement based, e.g., reward based.

Example 47 is the method according to one of examples 45 to 46, wherein the information reflects a functioning of the task performing model, e.g., an operational functionality of the task performing model.

Example 48 is the method according to one of examples 45 to 47, wherein the information includes one or more mathematical relations, which are based on the task performing model, e.g., wherein the one or more mathematical relations map the task performing model.

Example 49 is the method according to one of examples 45 to 48, wherein the information includes a result of currying the task performing model.

Example 50 is the method according to one of examples 45 to 49, wherein the information about the task performing model includes an instance of the task performing model, e.g., when a (e.g., spatial and/or task subject) deviation of the one or more tasks from the one or more further tasks is less than a stored threshold.

Example 51 is the method according to one of examples 45 to 50, wherein the task performing model implements a policy (e.g., task performing policy), the information about the task performing model including the policy, e.g., when a spatial deviation of the one or more tasks from the one or more further tasks reaches or passes a stored threshold, and/or when a task subject deviation of the one or more tasks from the one or more further tasks is less than a stored threshold.

Example 52 is the method according to one of examples 45 to 51, wherein the task performing model implements a parameter set, the information about the task performing model including the parameter set, e.g., when a (e.g., spatial and/or task subject) deviation of the one or more tasks from the one or more further tasks reaches or passes a stored threshold.

Example 53 is a controller (e.g. for a network device, for an automated, e.g., autonomous, machine), including one or more processors configured to perform the method according to one of examples 45 to 52.

Example 54 is one or more non-transitory computer-readable media storing instructions thereon that, when executed by one or more processors, direct the one or more processors to perform the method according to one of examples 45 to 52.

Example 55 is a network device (e.g., an automated, e.g., autonomous, machine) machine including the controller according to example 53 and/or the one or more non-transitory computer-readable media according to example 54.

Example 56 is one of the examples 1 to 55, wherein the information about the task performing model of the automated, e.g., autonomous, machine further include a provenance identifier identifying a provenance of the information about the task performing model.

Example 57 is one of the examples 1 to 56, wherein the information about the task performing model include (e.g., are) a result of filtering learned knowledge of the task performing model, e.g., having a high signal/noise ratio of filtering.

Example 57 is one of the examples 1 to 56, wherein the information about the task performing model include an instantiated asset, the asset including a result of currying the task performing model.

Example 58 is the example 57, wherein the asset is in accordance with an electronic market.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method. All acronyms defined in the above description additionally hold in all claims included herein.

What is claimed is:

1. A controller for an automated machine, the controller comprising:
a processor configured to:
determine that a group affiliation of the automated machine switched from a first group of automated machines to a second group of automated machines, the first group of automated machines being assigned to a first task, the second group of automated machines being assigned to a second task;
generate a message for a network device associated with the second group of automated machines in accordance with a communication protocol, the message comprising information about a task performing model of the automated machine, the task performing model being based on a result of performing the first task by the automated machine;
determine whether the result of performing the first task by the automated machine fulfils a quality criterion; and
initiate switching the group affiliation of the automated machine from the first group to the second group based on whether the result of performing the first task by the automated machine fulfils the quality criterion.

2. The controller according to claim 1, wherein the processor is further configured to determine that the group affiliation of the automated machine switched, when one or more of the following events occur:
the automated machine moves from a location of the first task to a location of the second task;
a stored group affiliation identifier of the automated machine is updated; and
a group communication protocol of the automated machine is updated.

3. The controller according to claim 1, wherein the processor is further configured to initiate switching the group affiliation of the automated machine from the first group of automated machines to the second group of automated machines, when the processor:
obtains an instruction to switch the group affiliation;
determines that a duration of the group affiliation being unchanged reaches or passes a stored threshold;
determines that a grade of completion of the first task reaches or passes a stored threshold;
determines that an operational condition of the automated machine fulfils an operational criterion; or
estimates that a gain obtained by switching the group affiliation of the automated machine fulfils a gain criterion.

4. The controller according to claim 1, wherein the processor is further configured to initiate switching the group affiliation of the automated machine from the first group of automated machines to the second group of automated machines, when:
a connectivity of the automated machine to a server reaches or passes a stored threshold;
a storage of the automated machine to a server reaches or passes a stored threshold; or
a capability of the automated machine to a server reaches or passes a stored threshold.

5. The controller according to claim 1, wherein the processor is further configured to initiate switching the group affiliation of the automated machine from the first group of automated machines to the second group of automated machines, when a deviation of the result of performing the first task from a predefined result reaches or passes a stored threshold; or the first task is completed.

6. The controller according to claim 1, wherein the processor is further configured to initiate switching the group affiliation of the automated machine from the first group of automated machines to the second group of automated machines, when the processor determines that an advance of completing the second task by the second group of automated machines comprising the automated machine reaches or passes a stored threshold;

the first group of automated machines is capable of completing the first task without the automated machine; or training the task performance model based on a result of performing the second task advances the task performance model more than training the task performance model based on the result of performing the first task.

7. The controller according to claim 1, wherein the network device is a further automated machine of the second group of automated machines.

8. The controller according to claim 1, wherein the network device is a stationary server, the server being configured to implement a task management for the second task.

9. The controller according to claim 1, wherein the information about the task performing model of the automated machine comprise a provenance identifier identifying a provenance of the information about the task performing model and further comprise a result of filtering learned knowledge of the task performing model.

10. The controller according to claim 1, wherein the information about the task performing model comprise an instantiated asset including a result of currying the task performing model, wherein the asset is in accordance with an electronic market.

11. The controller according to claim 1, wherein the task performing model is trained based on the result of performing the first task by the automated machine.

12. The controller according to claim 1, wherein the information reflects a functioning of the task performing model.

13. The controller according to claim 1, wherein the information comprises a mathematical relation, which emulates the task performing model.

14. The controller according to claim 1, wherein the information comprises a result of currying the task performing model.

15. The controller according to claim 14, wherein the processor is further configured to perform the currying of the task performing model.

16. The controller according to claim 1, wherein the information about the task performing model comprises an instance of the task performing model.

17. The controller according to claim 16, wherein the task performing model implements a task performing policy, the information about the task performing model comprising the task performing policy.

18. The controller according to claim 17, wherein the task performing model implements a parameter set, the information about the task performing model comprising the parameter set.

* * * * *